United States Patent
Ino et al.

(10) Patent No.: US 7,362,960 B2
(45) Date of Patent: *Apr. 22, 2008

(54) DATA RECORDING METHOD AND DATA RECORDING SYSTEM AS WELL AS DATA RECORDING MEDIUM

(75) Inventors: Yuji Ino, Tokyo (JP); Kanako Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1305 days.

This patent is subject to a terminal disclaimer.

(21) Appl. No.: 10/304,843

(22) Filed: Nov. 26, 2002

(65) Prior Publication Data

US 2003/0123843 A1 Jul. 3, 2003

(30) Foreign Application Priority Data

Nov. 27, 2001 (JP) ............................. 2001-361394

(51) Int. Cl.
*H04N 5/00* (2006.01)
(52) U.S. Cl. ..................... 386/117; 386/46; 386/95; 386/124
(58) Field of Classification Search ................ 386/46, 386/52, 95, 9, 97, 106, 111, 131, 117
See application file for complete search history.

(56) References Cited

U.S. PATENT DOCUMENTS

| | | | |
|---|---|---|---|
| 5,835,667 A | * | 11/1998 | Wactlar et al. ................ 386/96 |
| 5,974,218 A | | 10/1999 | Nagasaka et al. |
| 2001/0014971 A1 | | 8/2001 | Nagashima et al. |

FOREIGN PATENT DOCUMENTS

| | | |
|---|---|---|
| EP | 1 089 560 | 4/2001 |
| JP | 2000-92419 | 3/2000 |
| JP | 2001 216726 | 8/2001 |

\* cited by examiner

*Primary Examiner*—Thai Q. Tran
*Assistant Examiner*—Mishawn Dunn
(74) *Attorney, Agent, or Firm*—Frommer Lawrence & Haug LLP; William S. Frommer; Paul A. Levy

(57) ABSTRACT

A data recording method and a data recording system suitable for recording of a material for recording and attendant information are disclosed. When attendant information to video data generated corresponding to the video data is to be recorded, the video data are matched with first time information based on a first time base, and the matching is recorded as a time management table into a data recording medium. Further, the attendant information is matched with second time information based on a second time base, and the matching is recorded as an attendant information table into the same data recording medium or a different data recording medium. Further, matching between the first time base and the second time base or between the first time information and the second time information is recorded as a link table into the same data recording medium or the different data recording medium.

38 Claims, 33 Drawing Sheets

FIG. 2

| TYPE | FIRST TIME INFORMATION | SECOND TIME INFORMATION |
|---|---|---|
| CASE 1 | CLOCKING BY MATERIAL PROCESSING SECTION | CLOCKING BY ATTENDANT INFORMATION PROCESSING SECTION |
| CASE 2 | CLOCKING BY MATERIAL PROCESSING SECTION | CLOCKING BY RECORDING SECTION |
| CASE 3 | CLOCKING RECORDING SECTION | CLOCKING BY ATTENDANT INFORMATION PROCESSING SECTION |
| CASE 4 | CLOCKING BY RECORDING SECTION (COMMON TIME INFORMATION) | CLOCKING BY RECORDING SECTION (COMMON TIME INFORMATION) |

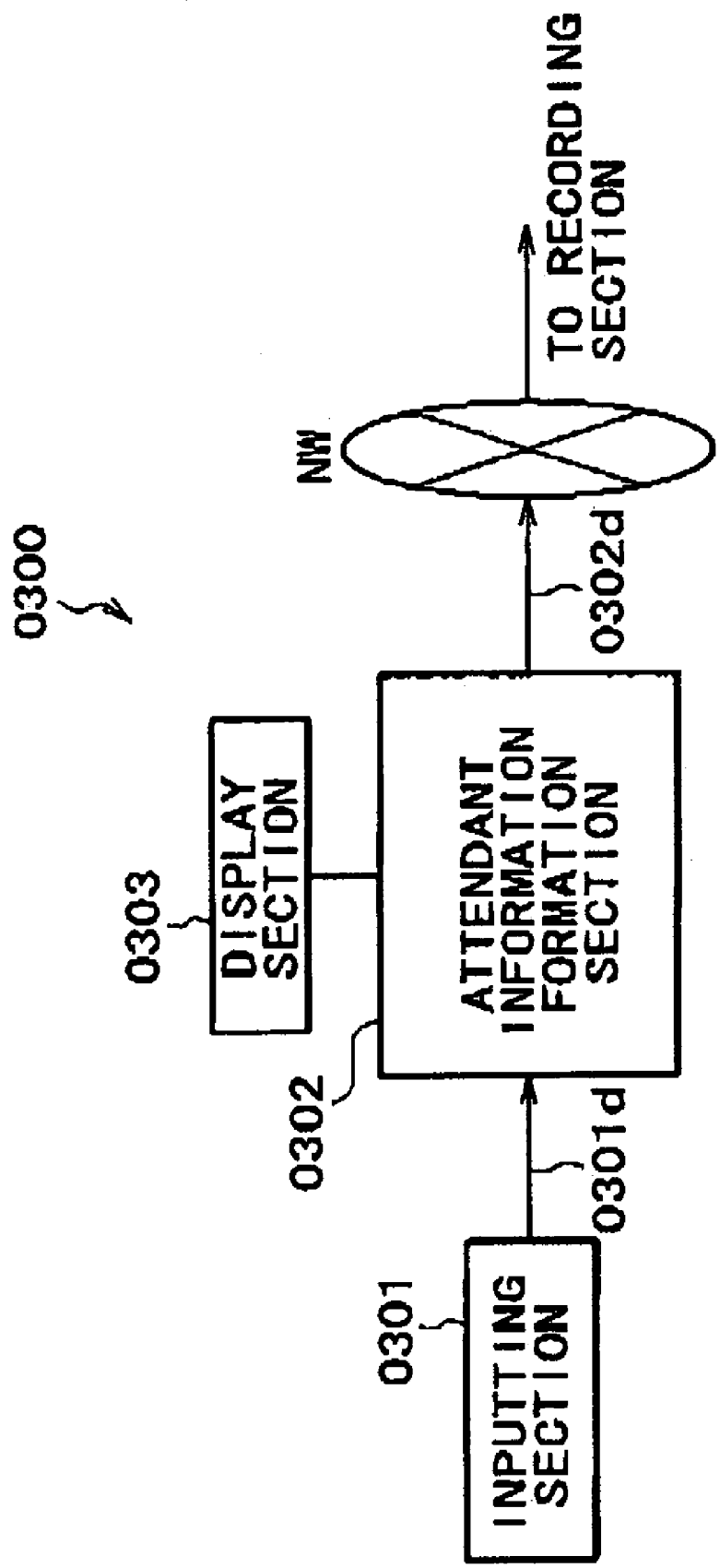

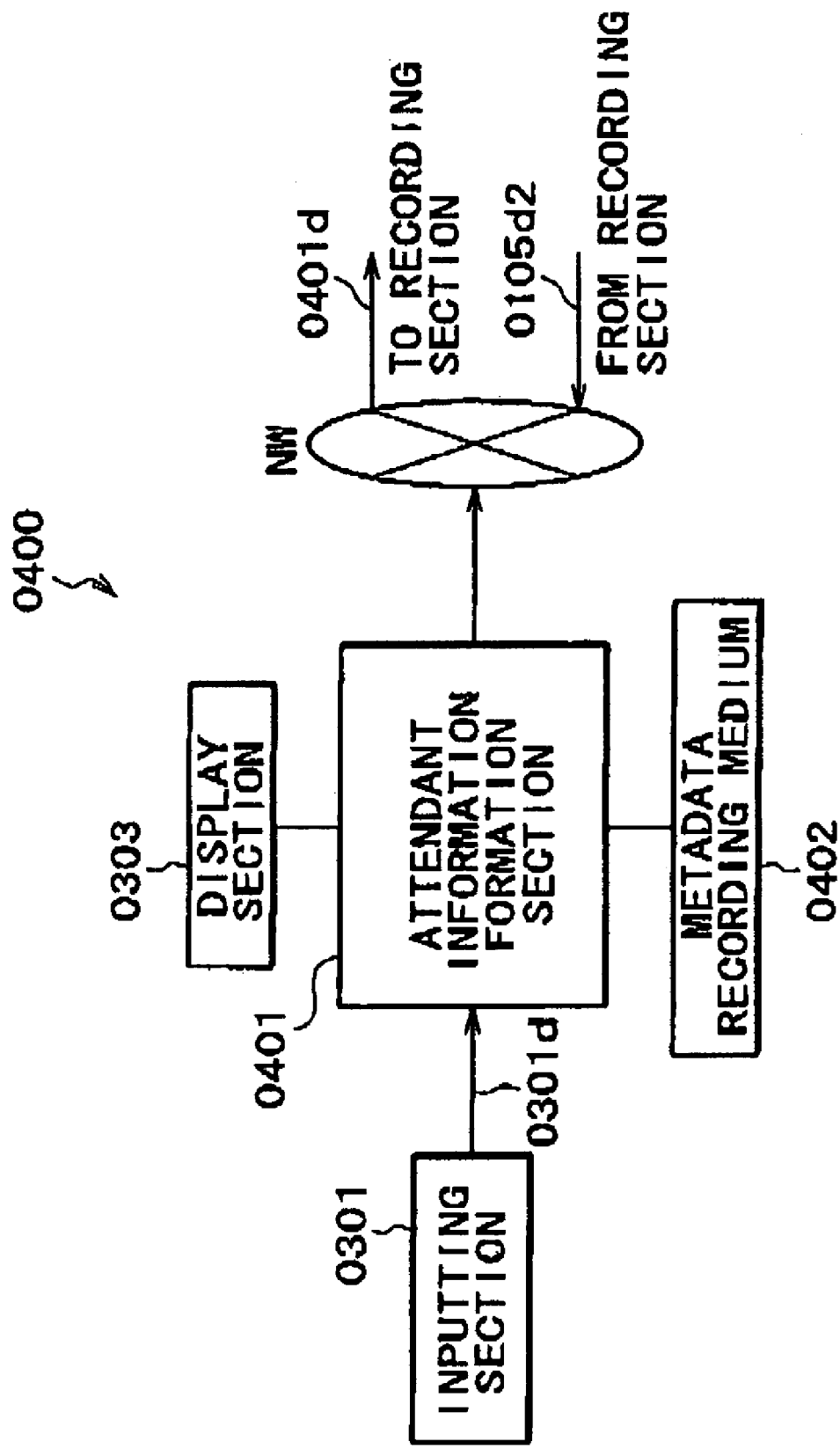

F I G. 2 6

| FIRST TIME INFORMATION | CLUSTER ADDRESS | SECTOR |
|---|---|---|
| 11:20:14:05:00 | h000000000000 | h00 |
| 11:20:14:05:01 | h00000000001E | h00 |
| 11:20:14:05:02 | h00000000003C | h00 |
| 11:20:14:05:03 | h00000000005A | h00 |
| 11:20:14:05:04 | h000000000078 | h00 |
| | | |

FIG. 27

| ATTENDANT INFORMATION | SECOND TIME INFORMATION |
|---|---|
| "START OF GAME" | 00:00:00 |
| "START OF ALL CARS" | 00:00:04 |
| "CRUSH OF PORSCHE CARRERA" | 00:00:32 |
| | |

FIG. 28

| FIRST TIME INFORMATION | SECOND TIME INFORMATION |
|---|---|
| 11:20:14:05:00 | 00:00:00 |
| 11:20:14:05:04 | 00:00:04 |
| 11:20:14:05:32 | 00:00:32 |
| | |

FIG. 29

| ATTENDANT INFORMATION | COMMON TIME INFORMATION | ADDRESS |
|---|---|---|
| PLAY BALL | t001 | abr01 |
|  | t002 | abr02 |
| NONE OUT IN THE TOP OF THE FIRST INNING 0-1 | t003 | abr03 |
|  | t004 | abr04 |
|  | t005 | abr05 |
|  | t006 | abr06 |
| ONE OUT IN THE TOP OF THE FIRST INNING ESTABLISHED | t007 | abr07 |
|  | t008 | abr08 |
|  | t009 | abr09 |
|  | t010 | abr10 |
| ONE OUT IN THE TOP OF THE FIRST INNING 0-1 | t011 | abr11 |
|  | t012 | abr12 |

```
138
    SHOT/POLLET/FAIL
    SHOT/PECKEN/GOAL
    SHOT/PECKEN/FAIL
```

DATA RECORDING METHOD AND DATA RECORDING SYSTEM AS WELL AS DATA RECORDING MEDIUM

BACKGROUND OF THE INVENTION

This invention relates to a data recording method and a data recording system as well as a data recording medium, and more particularly to a data recording method and a data recording system as well as a data recording medium for recording video data which form contents generated or updated every moment and associated data such as metadata formed incidentally to the contents.

Information that is generated and varies every moment as the state of an event varies includes information which is fetched and recorded continuously in a time series.

As an example, in production of a broadcasting program, image and sound information of a material of a data gathering object which varies in a time series is recorded as a source material, and the recorded source material is edited to produce a broadcasting material having a time series configuration. The broadcasting material is also called contents, and one broadcasting material is produced as a video stream wherein a plurality of events each formed as a broadcasting unit are connected. Here, an event is one continuous broadcasting unit such as, for example, one commercial message.

Where the data gathering object is, for example, a sports game such as a baseball game, images and sound picked up and collected by a relay or an on-the-spot relay are not only recorded as a source material by a recording apparatus but also broadcast immediately on the real time basis as a broadcasting program by an on-the-spot relay. Further, similarly also in a concert or a relay of a stage, images and sound which vary as the time passes are recorded as a source material or broadcast on the real time basis as an on-the-spot relay. In relay broadcasting of a television program, of images and sound picked up and collected, principally images with sound are broadcast, but in relay recording of television broadcasting, images and sound are recorded. On the other hand, in a radio program, sound is broadcast.

A source material recorded in such a manner as described above is subsequently subject to an editing operation in order to produce a broadcasting material (contents). However, since a source material normally is images and sound on the spot for several hours and is recorded continuously, they do not have any delimiter based on the contents. Meanwhile, since editing is an operation of extracting a particular portion with attention paid to contents of the source material, confirmation of contents of individual portions, which compose the source material, is required inevitably. However, since the source material has no limiter as described above, it cannot be avoided to carry out an inefficient operation of confirming contents while the entire source material is successively reproduced.

Therefore, conventionally a recorder grasps a variation of the situation which occurs in a relay or in an on-the-spot relay and writes a memorandum of it by hand writing every time so as to be left, and later, the pertaining portion of the source material is searched for and extracted manually based on the memorandum to perform an editing operation.

For example, where a memorandum during a relay of a baseball game is "Opening game of Giants vs. Yakult Swallows. In the offence of Yakult with the first out in the bottom of the eighth inning, the batter Kobayakawa hit a home run successively in three at bats from the pitcher Saito." and an editor tries to take this scene into a highlight program, the editor first searches a source material, in which images on the spot are recorded, manually to detect a portion of the bottom of the eighth inning and then manually advances the source material to the portion of the first out to reproduce the noticeable scene of the home run of the batter Kobayakawa.

Or, where, during a relay of a play of a ballet, a memorandum "During the play of Coppelia, Coppelius played by Mr. Komaki of the Komaki Ballet Organization fell from the second floor of the set. Not injured. Mr. Komaki in the impersonation appeared on a wing of the stage and apologized for the clumsy happening to the spectators. He announced to resume the ballet with the csardas. The play was resumed as announced." is written and the editor determines that it is necessary to cut the scene, it searches and deletes the first portion of the csardas.

In this manner, conventionally preparations for reference information are made by a hand-written memorandum.

However, for such preparations for reference information as described above, it is necessary for a recorder to write a memorandum for each scene while an image to be recorded such as, for example, a sports game is watched. Therefore, the recorder is obliged to carry out complicated operation, and the efficiency in operation is low. Further, there is the possibility that such a trouble as loss of the memorandum may occur.

Further, it is necessary for an editor to perform an operation of searching for a head position or an editing point in accordance with the memoranda from an image material for a long period of time. Therefore, complicated operation for a long period of time is required and the efficiency is low. Furthermore, in order to search and access image materials in the past, it is necessary to additionally provide a memorandum such as a script. Therefore, management of the accumulated materials is complicated, and they cannot be utilized efficiently.

SUMMARY OF THE INVENTION

It is an object of the present invention to provide data recording method and a data recording system as well as a data recording medium wherein a head search and determination of an editing point of an image material can be performed efficiently to achieve improvement in productivity of editing operation and improvement in searchability of and accessibility to image materials in the past and allow reasonable management of stored materials and reference information.

In order to attain the object described above, according to an aspect of the present invention, there is provided a data recording method, including the steps of fetching contents in a time series relationship as video data, the contents including an image with sound, an image or sound which vary as time passes, the image being a moving picture or/and a still picture, recording the video data into a data recording medium, and recording first matching information representative of direct or indirect matching between the video data and first time information based on an arbitrary first time base, attendant information to the contents which varies in parallel to the contents, second matching information representative of matching between the attendant information and second time information based on an arbitrary second time base, and third matching information representative of matching between the first time base and the second time base or between the first time information and the second time information into the data recording medium or/and a different arbitrary data recording medium.

The data recording method is carried by a data recording system, including a material processing section for fetching contents in a time series relationship as video data and processing the video data, the contents including an image with sound, an image or sound which vary as time passes, the image being a moving picture or/and a still picture, an attendant information processing section for fetching attendant information to the contents which varies in parallel to the contents and processing the attendant information, and a recording section including a mechanism for recording data into at least one data recording medium and operable to record the video data into the data recording medium and record first matching information representative of direct or indirect matching between the video data and first time information based on an arbitrary first time base, the attendant information, second matching information representative of matching between the attendant information and second time information based on an arbitrary second time base, and third matching information representative of matching between the first time base and the second time base or between the first time information and the second time information into the data recording medium or/and a different arbitrary data recording medium.

With the data recording method and the data recording system, video data are recorded into a data recording medium, and first matching information representative of direct or indirect matching between the video data and first time information based on an arbitrary first time base, attendant information, second matching information representative of matching between the attendant information and second time information based on an arbitrary second time base, and third matching information representative of matching between the first time base and the second time base or between the first time information and the second time information are recorded into the data recording medium or a different arbitrary data recording medium. Consequently, the attendant information and the video data are matched with each other through the intervention of the second matching information, third matching information and first matching information. Therefore, that video data which corresponds to any piece of the attendant information can be specified through the intervention of the second, third and first matching information, and the attendant information and the video data can be managed independently of each other. Further, the first matching information, second matching information and third matching information can be managed independently of each other.

Particularly where the attendant information and the video data are recorded into different data recording media, for example, different recording media placed at different places, and the first, second and third matching information is recorded into one of the data recording media or a further different data recording medium, the data recording media can be managed and utilized readily and independently of each other. Further, such data recording media can be sold as different commodities and utilized individually.

Further, where the first time base which is a scale for the first time information which is matched with the video data and the second time base which is a scale for the second time information which is matched with the attendant information can be set as arbitrary time bases different from each other, the time base for recording of the video data and the time base for recording of the attendant information can be separated from each other, and this allows a further wide variety of applications.

According to another aspect of the present invention, there is provided a data recording method, including the steps of fetching contents in a time series relationship as video data, the contents including an image with sound, an image or sound which vary as time passes and with regard to which time information is based on a common time base, the image being a moving picture or/and a still picture, recording the video data into a data recording medium, and recording first matching information representative of direct or indirect matching between the video data and time information based on an arbitrary time base, attendant information to the contents which varies in parallel to the contents, and second matching information representative of matching between the attendant information and the time information into the data recording medium or/and a different arbitrary data recording medium.

The data recording method is carried out by a data recording system, including a material processing section for fetching contents in a time series relationship as video data and processing the video data, the contents including an image with sound, an image or sound which vary as time passes and with regard to which time information is based on a common time base, the image being a moving picture or/and a still picture, an attendant information processing section for fetching attendant information to the contents which varies in parallel to the contents and processing the attendant information, and a recording section including a mechanism for recording data into at least one data recording medium and operable to record the video data into the data recording medium and record first matching information representative of direct or indirect matching between the video data and time information based on an arbitrary time base, the attendant information, and second matching information representative of matching between the attendant information and the time information into the data recording medium or/and a different arbitrary data recording medium.

With the data recording method and the data recording system, video data are recorded into a data recording medium, and first matching information representative of direct or indirect matching between the video data and time information, attendant information, and second matching information representative of matching between the attendant information and the time information are recorded into the data recording medium or a different arbitrary data recording medium. Consequently, the attendant information and the video data are matched with each other through the intervention of the second matching information and the first matching information. Therefore, that video data which corresponds to any piece of the attendant information can be specified through the intervention of the second and first matching information, and the attendant information and the video data can be managed independently of each other. Further, the first matching information and second matching information can be managed independently of each other.

For example, upon utilization, based on the recorded attendant information, that video data which corresponds to any piece of the attendant information can be specified readily through the intervention of the time information matched with the piece of the attendant information and the video data.

Particularly where the attendant information and the video data are recorded into different data recording media, for example, different recording media placed at different places, and the first and second matching information is recorded into one of the data recording media or a further different data recording medium, the data recording media can be managed and utilized readily and independently of each other.

According to a further aspect of the present invention, there is provided a data recording method, including the steps of fetching contents in a time series relationship as video data, the contents including an image with sound, an image or sound which vary as time passes, the image being a moving picture or/and a still picture, recording the video data into a data recording medium, and recording first matching information representative of matching between the video data and recorded positions of the video data, attendant information to the contents which varies in parallel to the contents, and second matching information representative of matching between the attendant information and the recorded positions of the video data into the data recording medium or/and a different arbitrary data recording medium.

The data recording method is carried out by a data recording system, including a material processing section for fetching contents in a time series relationship as video data and processing the video data, the contents including an image with sound, an image or sound which vary as time passes, the image being a moving picture or/and a still picture, an attendant information processing section for fetching attendant information to the contents which varies in parallel to the contents and processing the attendant information, and a recording section including a mechanism for recording data into at least one data recording medium and operable to record the video data into the data recording medium and record first matching information representative of matching between the video data and recorded positions of the video data, the attendant information, and second matching information representative of matching between the attendant information and the recorded positions of the video data into the data recording medium or/and a different arbitrary data recording medium.

With the data recording method and the data recording system, video data are recorded into a data recording medium, and first matching information representative of matching between the video data and recorded positions of the video data, attendant information, and second matching information representative of matching between the attendant information and the recorded positions of the video data are recorded into the data recording medium or a different arbitrary data recording medium. Consequently, the attendant information and the video data are matched with each other through the intervention of the second matching information and the first matching information. Therefore, that video data which corresponds to any piece of the attendant information can be specified through the intervention of the second and first matching information, and the attendant information and the video data can be managed independently of each other. Further, the first matching information and second matching information can be managed independently of each other.

Particularly where the attendant information and the video data are recorded into different data recording media, for example, different recording media placed at different places, and the first and second matching information is recorded into one of the data recording media or a further different data recording medium, the data recording media can be managed and utilized readily and independently of each other.

According to a still further aspect of the present invention, there is provided a data recording medium wherein attendant information which varies, as time passes, in parallel to video data including an image with sound, an image or sound which vary as time passes is recorded, the image being a moving picture or/and a still picture, the video data being recorded separately in a matched relationship with first time information based on an arbitrary first time base, the attendant information being recorded in a computer-readable manner together with second time information based on an arbitrary second time base, and matching information representative of matching between the first time base and the second time base or between the first time information and the second time information is recorded in a computer-readable manner.

With the data recording medium, the attendant information and the second time information, and the first time base and the second time base or the first time information and the second time information are recorded in a matched relationship with each other and in a computer-readable manner. Therefore, a computer can read the recorded second time information based on the recorded attendant time information, read the matching between the second time base and the first time base or the first time information matched with the second time information based on the matching information and then specify a corresponding portion of the video data based on the first time information.

According to a yet further aspect of the present invention, there is provided a data recording medium wherein attendant information which varies, as time passes, in parallel to video data including an image with sound, an image or sound which vary as time passes and recorded separately with addresses is recorded in a computer-readable manner together with and using the address information of the video data.

With the data recording medium, the attendant information and the address information of the video data corresponding to the attendant information are recorded in a matched relationship with each other and in a computer-readable manner. Therefore, a computer can read, based on any piece of the recorded attendant information, the corresponding recorded address information and then specify a corresponding portion of the video data based on the address information.

According to an additional aspect of the present invention, there is provided a data recording medium wherein attendant information which varies, as time passes, in parallel to video data including an image with sound, an image or sound which vary as time passes and recorded separately based on common time information is recorded applying the common time information in a computer-readable manner together with the time information applied when the attendant information is generated.

With the data recording medium, attendant information and the common time information when the attendant information is generated are recorded in a computer-readable manner, and the time information is common also to recording of the video data. Consequently, a computer can read, based on any piece of the recorded attendant information, the corresponding recorded common time information and specify a corresponding portion of the video data based on the time information.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a view illustrating different types of information used in the data recording system of FIG. 1;

FIG. 3 is a block diagram showing a form of an attendant information processing section shown in FIG. 1;

FIG. 4 is a similar block diagram showing another form of the attendant information processing section shown in FIG. 1;

FIG. 26 is a view illustrating an example of a configuration of a time management table shown in FIG. 1;

FIG. 27 is a view illustrating an example of a configuration of an attendant information table shown in FIG. 1;

FIG. 28 is a view illustrating an example of a configuration of a link table shown in FIG. 1;

FIG. 29 is a view illustrating a concept of common time information used in the data recording system of FIG. 1;

FIG. 34 is a view illustrating an example of order adapted type information by a numerical representation of score data;

FIG. 35 is a view illustrating an example of order adapted type information by an expanded numerical expression of score data; and FIG. 36 is a view illustrating an example of guide information by order adapted type information by a numerical representation and significance adapted type information by a character representation.

DESCRIPTION OF THE PREFERRED EMBODIMENT

In the following, a preferred embodiment of the present invention is described in detail with reference to the accompanying drawings. It is to be noted that several terms used in the present specification are defined as given below. In particular, the term "image" is defined as "at least one of a moving picture and a still picture". The term "video data" is defined as data including one of an image with sound which changes as the time passes, an image and sound. A typical example of video data is data of an image with sound in a relay of a game of sports.

Also, information formed or produced in attendance on video data and which changes as the time passes is defined as "attendant information". A typical example of attendant information is score data in which the process of game of sports is recorded.

Figure 1:
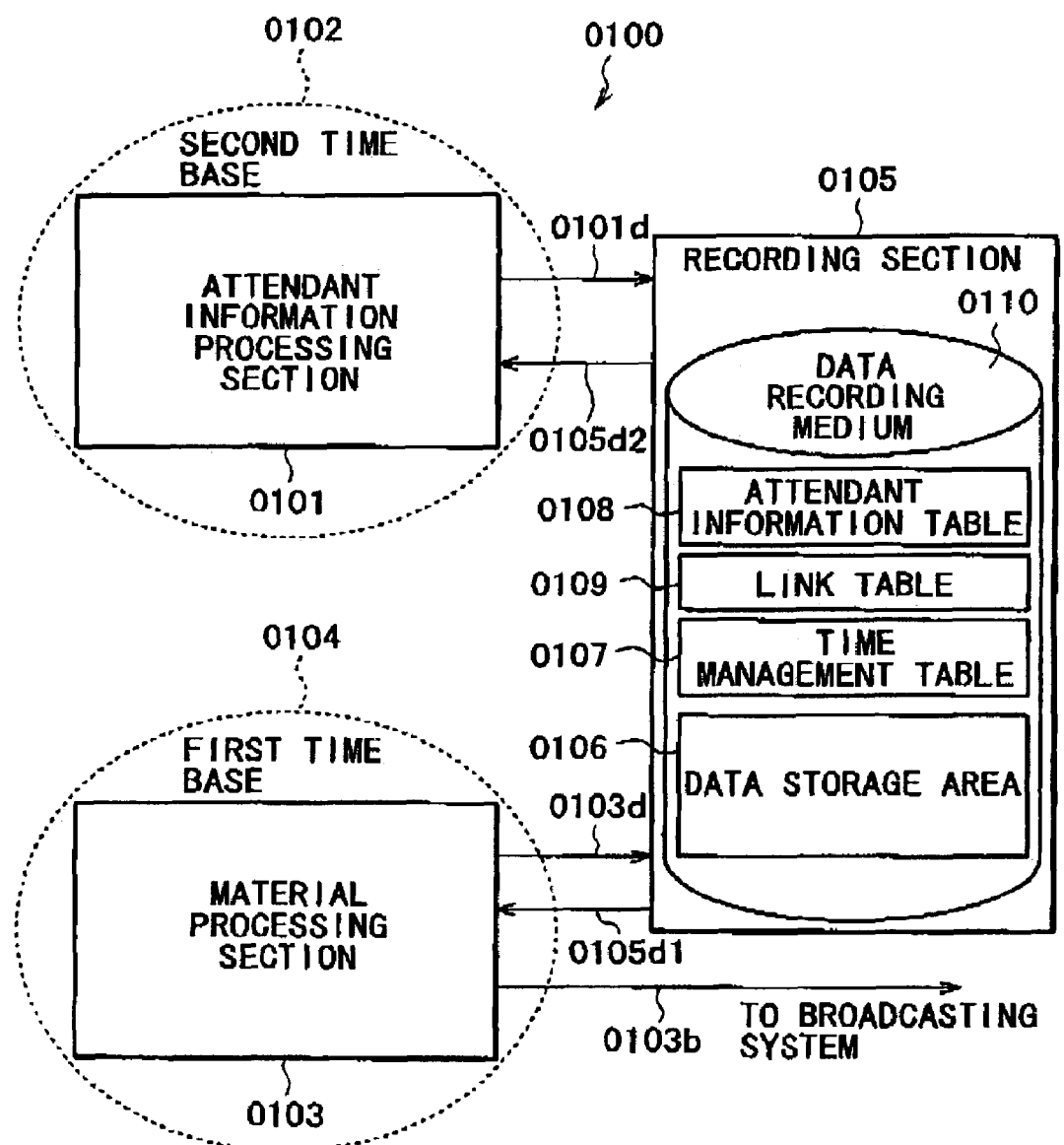
FIG. 1 is a block diagram illustrating a data recording system to which the present invention is applied.

FIG. 1 shows a general block configuration of a data recording system to which the present invention is applied. Referring to FIG. 1, the data recording system shown is generally denoted by 0100 and includes a material processing section 0103; attendant information processing section 0101; and a recording section 0105.

The material processing section 0103 performs a process of fetching contents of a material of an object of recording and fetches a signal from an image pickup camera or the like. Accordingly, the material processing section 0103 makes a direct contact to a material generated (for example, a sports game).

The material processing section 0103 has a function of forming an object material into video streams composed of video data which can be signaled, and signals a video stream 0103*d* suitable for recording to the recording section 0105 and signals another video stream 0103*b* suitable for broadcasting to a broadcasting system not shown. The video stream 0103*d* suitable for recording is recorded while the video stream 0103*b* suitable for broadcasting is broadcast as it is.

Here, each video stream involves lapse of time and change as the time elapses, and therefore, it is possible to measure the time for each part of the video stream and match the part with time information. Thus, the scale of the time measurement: is referred to as "first time base" (0104). Further, the time measured based on the first time base is referred to as "first time information". Accordingly, transition of each video stream is matched with first time information.

The first time base 0104 is set arbitrarily, for example, like local time at the time of a game of the football or the golf, and upon such setting, the first time base is not subject to any restriction from a second time base 0102 which is hereinafter described.

The first time information is set and managed by the material processing section 0103. Further, such first time information is sometimes applied as a code 0105*d*1 from the recording section 0105 to the material processing section 0103.

It is to be noted that a detailed configuration of the material processing section is hereinafter described.

The attendant information processing section 0101 has a function of forming attendant information, which is generated or formed incidentally to a video stream, into time series data and signaling the same, and signals attendant information 0101*d* to the recording section 0105. Here, the attendant information 0101*d* involves lapse of time and changes as the time passes, and therefore, it is possible to measure the time for each part of the attendant information 0101*d* and match the part with time information. Thus, the scale for the time measurement is referred to as "second time base" (0102). Further, the time measured based on the second time base 0102 is referred to as "second time information". Accordingly, variation of the attendant information 0101*d* is matched with second time information.

The second time base 0102 is set arbitrarily independently of the first time base 0104 which is applied to a video stream and is not restricted by the first time base 0104 (for example, local time at the time of a game) at all. For example, while a video stream recorded can be reproduced at an arbitrary point of time after the recording while the time upon such reproduction can be set as the second time base 0102.

It is to be noted, however, that the second time base 0102 is sometimes set commonly to the first time base 0104. For example, in an on-the-spot relay of a marathon game, broadcasting on the real time basis and recording of video streams are performed simultaneously, and attendant information is formed on the real time basis. In such an instance, the time bases become common, and consequently, also the time information becomes common time information.

It is to be noted that a detailed configuration of the attendant information processing section 0101 is hereinafter described.

The recording section 0105 has a data recording and storing function and accommodates a data recording medium 0110, and records the video stream 0103*d* signaled from the material processing section 0103 and the attendant information 0101*d* signaled from the attendant information processing section 0101 so that any portion of the video stream 0103*d* can be specified from attendant information 0101*d*.

More particularly, the recording section 0105 records the video stream 0103*d* signaled from the material processing section 0103 as time series video data into a data storage area 0106 on the data recording medium 0110. Further, the recording section 0105 records an time management table 0107 for matching address information of the addresses into which the video data are recorded with the first time information, an attendant information table 0108 for matching the attendant information 0101*d* and the second time information, and a link table 0109 for matching the first time base 0104 and the second time base 0102 or the first time information and the second time information onto the data recording medium 0110.

The time management table 0107 serves as first matching information, and the attendant information table 0108 services as second matching information while the link table 0109 serves as third matching information.

The recording section 0105 fetches time information from a timer built therein or from an external clock device and sets the first time information or/and the second time information based on the thus fetched time information. Then, the recording section 0105 supplies the first time information or/and the second time information as first time information 0105*d*1 to the material processing section 0103 or/and as second time information 0105*d*2 to the attendant information processing section 0101.

If the first time base 0104 and the second time base 0102 are set same as each other, then they make a common time base, and therefore, common time information measured based on the common time base is applied to perform such recording as described above. In this instance, the link table 0109 can be omitted. Further, the common time information may be supplied to the material processing section 0103 or/and the attendant information processing section 0101.

It is to be noted that a detailed configuration of the recording section 0105 is hereinafter described.

In the present embodiment, second time information is stamped to the attendant information 0101*d* based on the second time base 0102 by the built-in timer or the like. Thus, when the attendant information 0101*d* is supplied to the recording section 0105, the recording section 0105 uses the received second time information, and therefore, second time information is not produced in the recording section 0105. Thereafter, the attendant information 0101*d* and the second time information are recorded in a matched relationship with each other. The information in this instance is recorded particularly as the attendant information table 0108.

On the other hand, otherwise if the attendant information 0101*d* is supplied to the recording section 0105 while second time information is not stamped to attendant information by the attendant information processing section 0101, then the recording section 0105 produces second time information based on the second time base 1102 by means of the timer built therein such that the second time information is matched with the attendant information 0101*d*. Thereafter, the recording section 0105 records the attendant information 0101*d* and the second time information in a matched relationship with each other particularly into the attendant information table 0108.

In the following, time information is described more particularly.

To a material (contents) recorded already, that is, to video data recorded already, time codes at which the video data are recorded are recorded. However, upon editing, it is impossible to suppose the contents of a portion of the video data only from the pertaining time code. The information is insufficient only with the time code. However, it is inefficient to carry out editing operation while all of the recorded video data are watched. Therefore, in the present invention, the attendant information is utilized as intermediate information with which contents can be supposed readily. In other words, the attendant information is utilized as measures for searching or editing operation.

On the other hand, when attendant information for editing operation or searching is produced after contents are recorded, the attendant information is matched with the time codes recorded upon preceding recording. Such time codes are used as the first time information based on the first time base defined in the present embodiment. One form of the time code is a real-time time code and includes the time at that time, for example, the standard time, recorded, for example, together with the year, month and day. Alternatively, an elapsed period of time from the origin of time determined at that time is recorded.

On the other hand, when it is tried to produce attendant information from now on, a time code recorded in a matched relationship with attendant information is the time at present, that is, the second time information based on the second time base defined in the present embodiment. Accordingly, the first time base and the second time base are generally different from each other.

Further, in the case where a time code of local time is stamped or a VITC representation by an arbitrarily set time base is given in an event broadcast on the real time base, from the West European block, North America, South America or the like, an event distributed on the real time basis through a communication line or the like, the time code or the representation is used as the first time base. Here, if the local time is set to the second time base, then an estrangement occurs and the first time base and the second time base do not coincide with each other.

Therefore, in the present embodiment, a link table for matching the first time base and the second time base with each other is prepared.

Also it is possible to make the time information based on a common time base. A first example of the common time base is the Greenwich Mean Time universally used in the world and may additionally include the year, month and day. A second example is an elapsed period of time from a starting point of time determined between the persons concerned. Also this makes common time information between the persons concerned.

In the following, the attendant information is described.

The attendant information is time series information which is generated at such a timing as that of appearance of an arbitrary noticeable scene of contents which vary as the time passes. The attendant information functions as guide data which can guide the pertaining contents and functions also as a "bookmark" or a "label" for specifying the pertaining contents within a stream of the contents.

A representative example of the attendant information is event information formed in an event such as a game of some sports, a drama or a concert, for example, score data produced in an event of a relay of a baseball game.

Where a combination of attendant information and time information or a combination of attendant information and recorded position (that is, address) information is represented as "metadata" for the convenience-of description, the metadata can be recorded in a data recording medium in any of the following forms:

(a) Only metadata are recorded;
(b) Only video data are recorded; and
(b) Both of video data and metadata are recorded.

In the form (a), the data recording medium is preferably formed as a removable data recording medium suitable for movement by itself or for transportation. Particularly, a recording medium which can be carried readily as represented by a memory stick (commodity name) is applied. This allows recording, carrying and storage of metadata independent of collection recording of video data. Further, an independent removable data recording medium in which metadata including attendant information of noticed contents (video data) are recorded can be regarded as it is as a commodity. Here, an independent removable data recording medium in which metadata has a high value of utilization where it is combined with a configuration of the PPV (Pay Per View) for specific charging.

However, the data recording medium is not limited to a removable data recording medium. For example, if video data in a relay of a baseball game are transmitted from a baseball stadium through a transmission line and recorded by a database system of a broadcasting station while attendant information and matching information are recorded as metadata onto a non-removable HDD built in a personal computer temporarily set up in the baseball stadium, then when the personal computer is carried back to the broadcasting station after the end of the relay, such utilization as to transfer the recorded metadata to the database system or an editing system through a LAN or the like can be carried out. Also it is possible to transfer the recorded metadata to the database system of the broadcasting station or an editing system from the personal computer placed in the baseball stadium through a communication line after the end of the relay.

Further, also it is possible to record low resolution images of video data together with attendant information therefore into a non-removable HDD built in the personal computer temporarily set up in the stadium.

In the forms (b) and (c), from the necessity to record a stream of video data for a long period of time, a large capacity RAID system composed of a VTR (video tape recorder) or a plurality of VTRs which use a removable magnetic tape of a large recording capacity or a train of a plurality of magnetic disks rather than a removable data recording medium of a comparatively small recording capacity such as a memory card or a removable magnetic disk medium is applied suitably.

The data recording method and system according to the present invention allows several different forms depending upon processing of the first time information and the second time information as described above. FIG. 2 illustrates such different forms. As seen in FIG. 2, the forms can be classified into four different cases from case 1 to case 4.

In the case 1, the first time information is clocked by the material processing section 0103 while the second time information is clocked by the attendant information processing section 0101. Accordingly, the material processing section 0103 by itself manages the formation of the first time information based on the first time base 0104, and the attendant information processing section 0101 by itself manages the formation of the second time information based on the second time base 0102. The recording section 0105 does not manage the formation of the first time information and the second time information, but records the first time information and the second time information.

In the case 2, the first time information is clocked by the material processing section 0103 while the second time information is clocked by the recording section 0105. Accordingly, the material processing section 0103 by itself manages the formation of the first time information based on the first time base 0104, but the attendant information processing section 0101 does not manage the formation of the second time information based on the second time base 0102, and the recording section 0105 manages the formation of the second time information. Consequently, the recording section 0105 does not manage the formation of the first time information but manages the formation of the second time information, and records first time information and the second time information.

In the case 3, the first time information is clocked by the recording section 0105 while the second time information is clocked by the attendant information processing section 0101. Accordingly, the attendant information processing section 0101 by itself manages the formation of the second time information based on the second time base 0102, but the material processing section 0103 does not manage the formation of the first time information based on the first time base 0104, and the recording section 0105 manages the formation of the first time information. Consequently, the recording section 0105 does not manage the formation of the second time information but manages the formation of the first time information, and records the first time information and the second time information.

In the case 4, the first time information is clocked by the recording section 0105 while also the second time information is clocked by the recording section 0105. Accordingly, the material processing section 0103 does not manage the formation of the first time information based on the first time base 0104, and the attendant information processing section 0101 does not manage the formation of the second time-information based on the second time base 0102, but the recording section 0105 manages the formation of the first time information and the second time information. Further, the recording section 0105 records the first time information and the second time information. In the most general configuration of the case 4, the first time base 0104 and the second time base 0102 are set to the same or common time base, and common time information is used for formation and recording of video data and attendant information.

In the following, various forms of the attendant information processing section 0101 shown in FIG. 1 are described.

FIG. 3 shows a configuration of a form of the attendant information processing section. Referring to FIG. 3, the attendant information processing section 0300 includes an inputting section 0301 for accepting a manual input of data regarding an event of an object of recording and supplying the inputted data as input data 0301d; an attendant information formation section 0302 for forming attendant information based on the input data 0301d supplied thereto and sending the formed attendant information as attendant information 0302d to the recording section 0105 through the communication network NW; and a display section 0303 connected to the attendant information formation section 0302 for displaying the formed attendant information and so forth on a screen thereof. The attendant information processing section 0300 is composed principally of a computer, especially a personal computer of the notebook type or the like which can be carried to a site readily, and the functioning blocks of the attendant information processing section 0300 such as the inputting section 0301, attendant information formation section 0302 and a communication controller not shown are prepared as programs which can be read and executed by a CPU.

The inputting section 0301 may be a keyboard apparatus which is a peripheral apparatus of a computer, an apparatus of the keyboard type for exclusive use called Sports Coder conventionally used at a sports relaying site, a speed measuring instrument for exclusive use called speed gun, or the like. It is otherwise possible to configure the attendant information processing section 0300 such that the attendant information formation section 0302 does not have the function of forming second time information and the attendant information processing section 0300 sends attendant information 0302d which includes no second time information to the recording section 0105. Therefore, the attendant information processing section 300 is applied to the case 2 or the case 4 described hereinabove.

FIG. 4 shows a configuration of another form of the attendant information processing section. Referring to FIG. 4, the attendant information processing section 0400 includes an inputting section 0301; an attendant information formation section 0401 for forming attendant information based on the input data 0301d supplied thereto, for sending the formed attendant information as attendant information 0401d to the recording section 0105 through the communication network NW, for receiving second time information 0105d2 (refer to FIG. 1) sent thereto from the recording section 0105 through the communication network NW, and for recording the received second time information 0105d2 in a matched relationship with the attendant information 0401d into a data recording medium 0402; a display section 0303; and the data recording medium 0402. The attendant information processing section 0400 is composed principally of a computer, especially a personal computer of the notebook type or the like which can be carried to a site readily, and the functioning blocks of the attendant information processing section 0400 such as the inputting section 0301, attendant information formation section 0401 and a communication controller not shown are prepared as programs which can be read and executed by a CPU.

Here, the attendant information formation section 0401 is configured such that it does not have the function of forming the second time information and therefore sends the attendant information 0401d, which does not include the second time information, to the recording medium 0105. Consequently, the attendant information processing section 0400 is applied to the case 2 or the case 4 described hereinabove.

To the metadata recording medium 0402, preferably a peripheral device including a removable semiconductor memory in the form of a small peace or a card which is small in size and can be carried readily as represented by a memory stick (commodity name), a flexible disk, a cassette video medium (recording medium for a video tape recorder), an optical medium and so forth can be applied, and also a hard disk other than the hard disk (HD) on which video data are recorded can be applied.

It is to be noted that recording media other than a data recording medium on which video data are recorded are hereinafter referred to collectively as "other arbitrary data recording media". Therefore, the attendant information processing section 0400 corresponds to recording and storing of the attendant information table 0108 (refer to FIG. 1) into the metadata recording medium 0402 which is one of the "other arbitrary data recording media".

Figure 5:
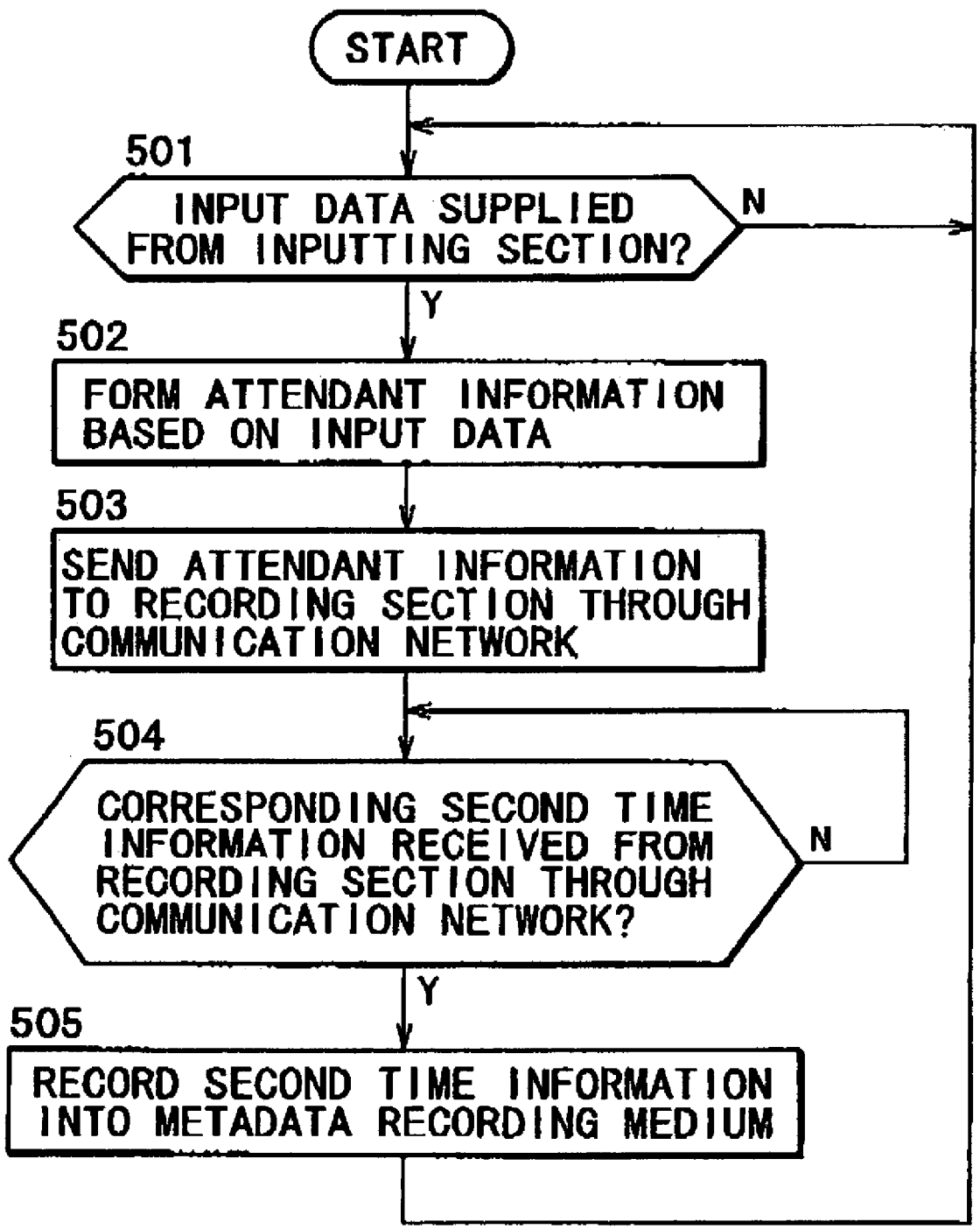
FIG. 5 is a flow chart illustrating operation of the attendant information processing section of FIG. 4.

Now, operation of the attendant information processing section 0400 is described with reference to FIG. 5.

If input data 0301d are supplied from the inputting section 0301 to the attendant information processing section 0400 at step 501, then the attendant information formation section 0401 forms attendant information 0401d based on the input data 0301d at step 502, and sends the attendant information 0401d to the recording section 0105 through the communication network NW at step 503. Then at step 504, the attendant information processing section 0400 waits that corresponding second time information is sent thereto from the recording section 0105 through the communication network NW. Then, when second time information 0105d2 is received, the attendant information processing section 0400 records and stores the second time information 0105d2 in a matched relationship with the attendant information 0401d into the metadata recording medium 0402 (step 505).

Figure 6:
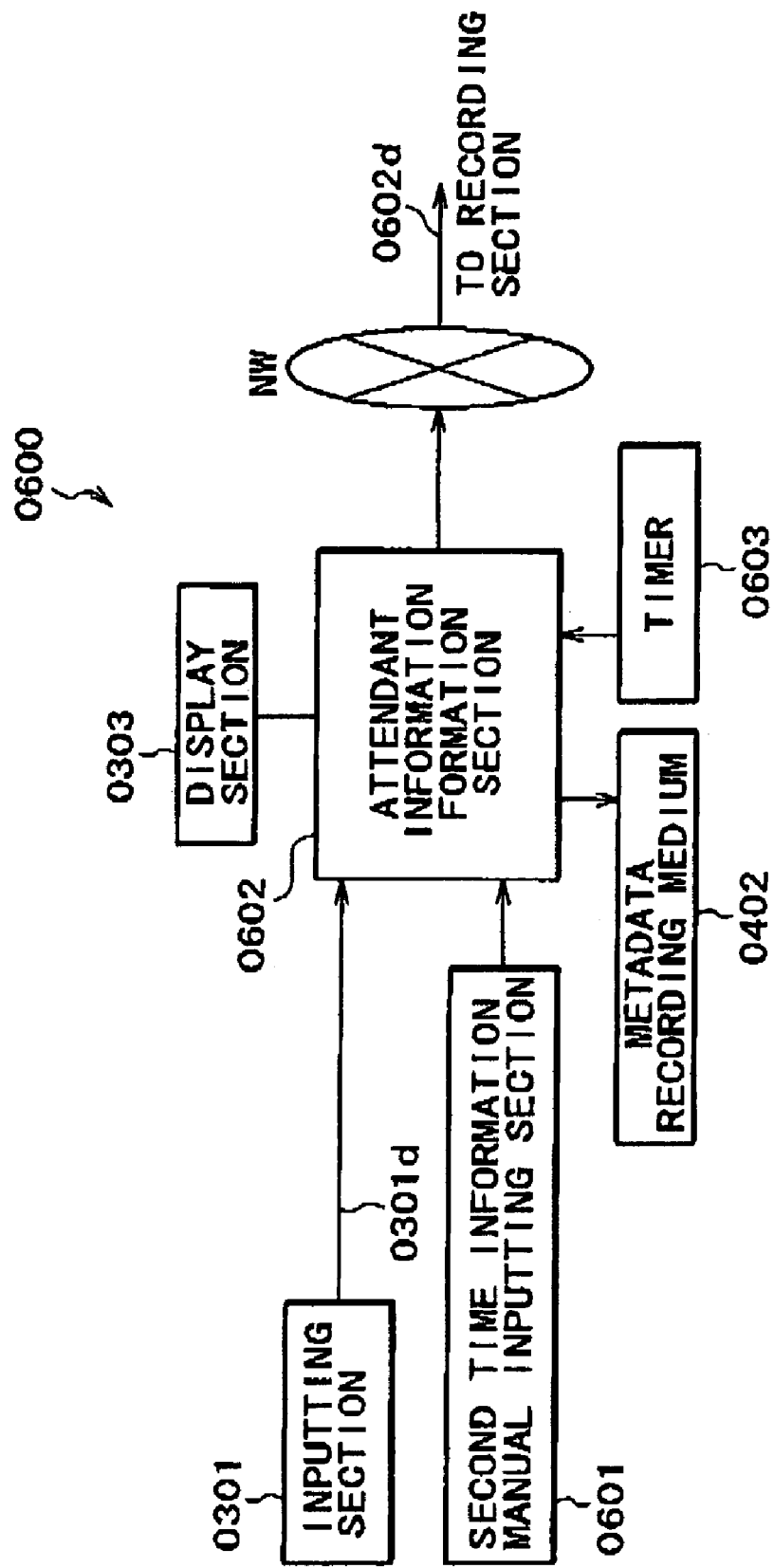
FIG. 6 is a similar block diagram showing a further form of the attendant information processing section shown in FIG. 1.

FIG. 6 shows a configuration of a further form of the attendant information processing section. Referring to FIG. 6, the attendant information processing section 0600 includes an inputting section 0301; a second time information-manual inputting section 0601; a timer 0603 capable of measuring and outputting elapsed time from an arbitrary origin including the time at present; an attendant information formation section 0602 for forming attendant information based on the input data 0301d supplied thereto, for sampling time data received from the timer 0603 at a timing at which the input data 0301d is received to form second time information or determining data received from the second time information manual inputting section 0601 as second time information and matching the attendant information with the second time information, for sending the attendant information and the second time information as attendant information 0602d with second time information to the recording section 0105 through the communication network NW, and for recording the attendant information and the second time information matched with each other into a metadata recording medium 0402; and a display section 0303; and the metadata recording medium 0402.

Similarly to the forms described above, the attendant information processing section 0600 is composed principally of a computer, especially a personal computer of the notebook type or the like which can be carried to a site readily, and the functioning blocks of the attendant information processing section 0600 such as the inputting section 0301, attendant information formation section 0602 and a communication controller not shown are prepared as programs which can be read and executed by a CPU.

Thus, the attendant information processing section 0600 is configured such that it has the function of forming the second time information and sends the attendant information 0602*d* with second time information to the recording medium 0105. Consequently, the attendant information processing section 0600 is applied to the case 1 or the case 3 described hereinabove. Further, the attendant information processing section 0600 corresponds to recording and storing of the attendant information table 0108 into the metadata recording medium 0402 which is one of the "other arbitrary data recording media" similarly as in the preceding forms.

Figure 7:
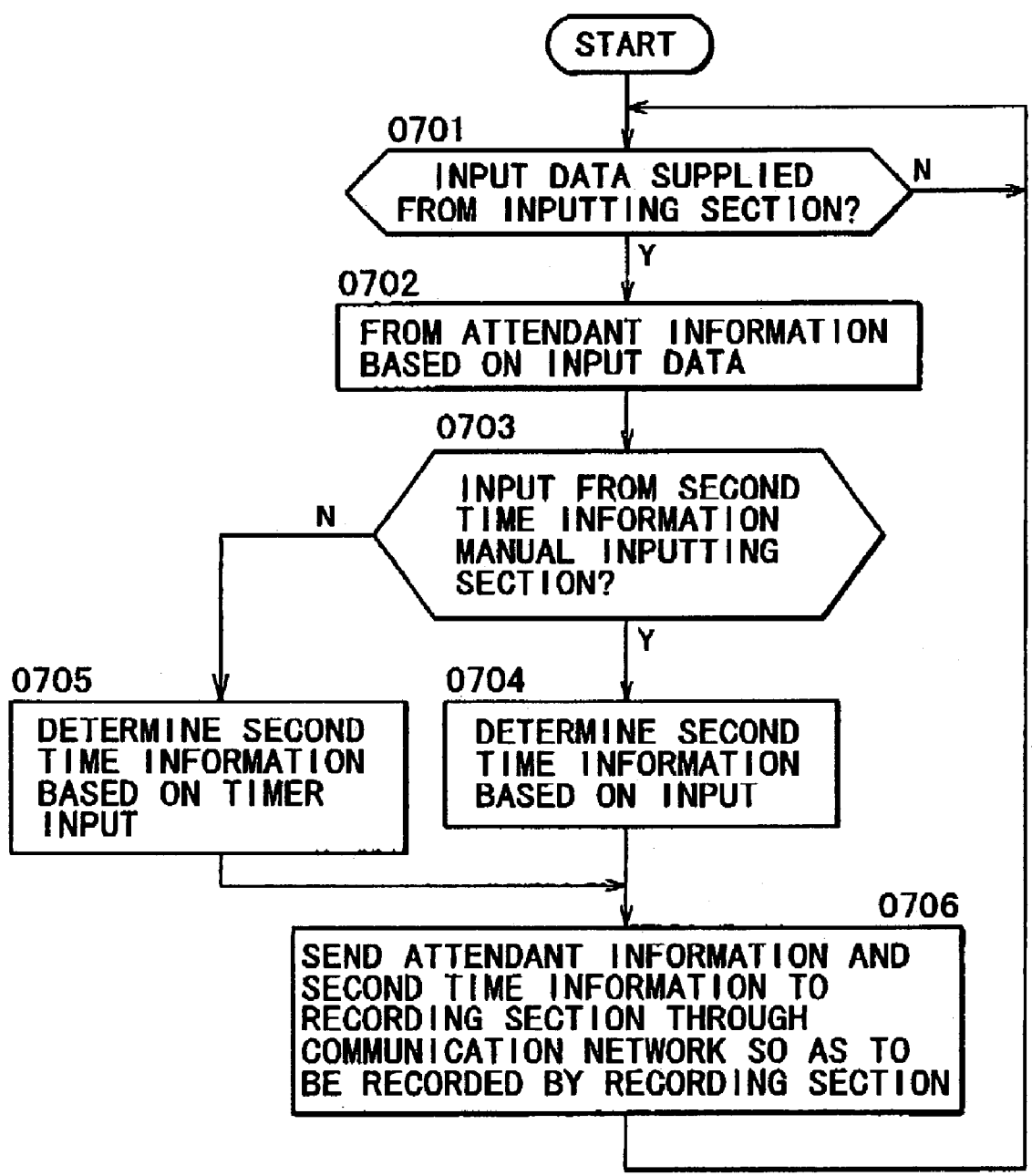
FIG. 7 is a flow chart illustrating operation of the attendant information processing section of FIG. 6.

Now, operation of the attendant information processing section 0600 is described with reference to FIG. 7.

If input data 0301*d* are supplied from the inputting section 0301 to the attendant information processing section 0600 at step 701, then the attendant information formation section 0602 forms attendant information based on the input data 0301*d* at step 702, and confirms whether or not data are inputted from the second time information manual inputting section 0601 at step 703.

If a data input is received from the second time information manual inputting section 0601, then the attendant information processing section 0600 determines second time information based on the input data at step 704. On the other hand, if no data input is received at step 703, then the processing advances to step 705, at which the attendant information processing section 0600 samples the time data received from the timer 0603 to determine second time information. In this manner, in the present form, the attendant information processing section 0600 can determine second time information either based on the built-in timer 0603 or from an external input.

Then at step 706, the attendant information formation section 0602 matches the attendant information and the second time information with each other and signals the thus matched information as attendant information 0602*d* with second time information to the recording section 0105 through the communication network NW. Further, the attendant information and the second time information matched with each other are recorded and stored into the metadata recording medium 0402.

While several examples of the form of the attendant information processing section 0101 shown in FIG. 1 are described, various other forms having different configurations are possible. Here, the communication network NW is formed as a bi-directional network which may be a privately leased line, a public network, a CATV (cable television) network, a network formed from a combination of a satellite line and a public network or the like. In this instance, a point-to-point system or a directly coupled system, a packet network communication configuration by an open network or the like can be applied to the communication network NW.

In the following, several forms of the material processing section 0103 shown in FIG. 1 are described.

Figure 8:
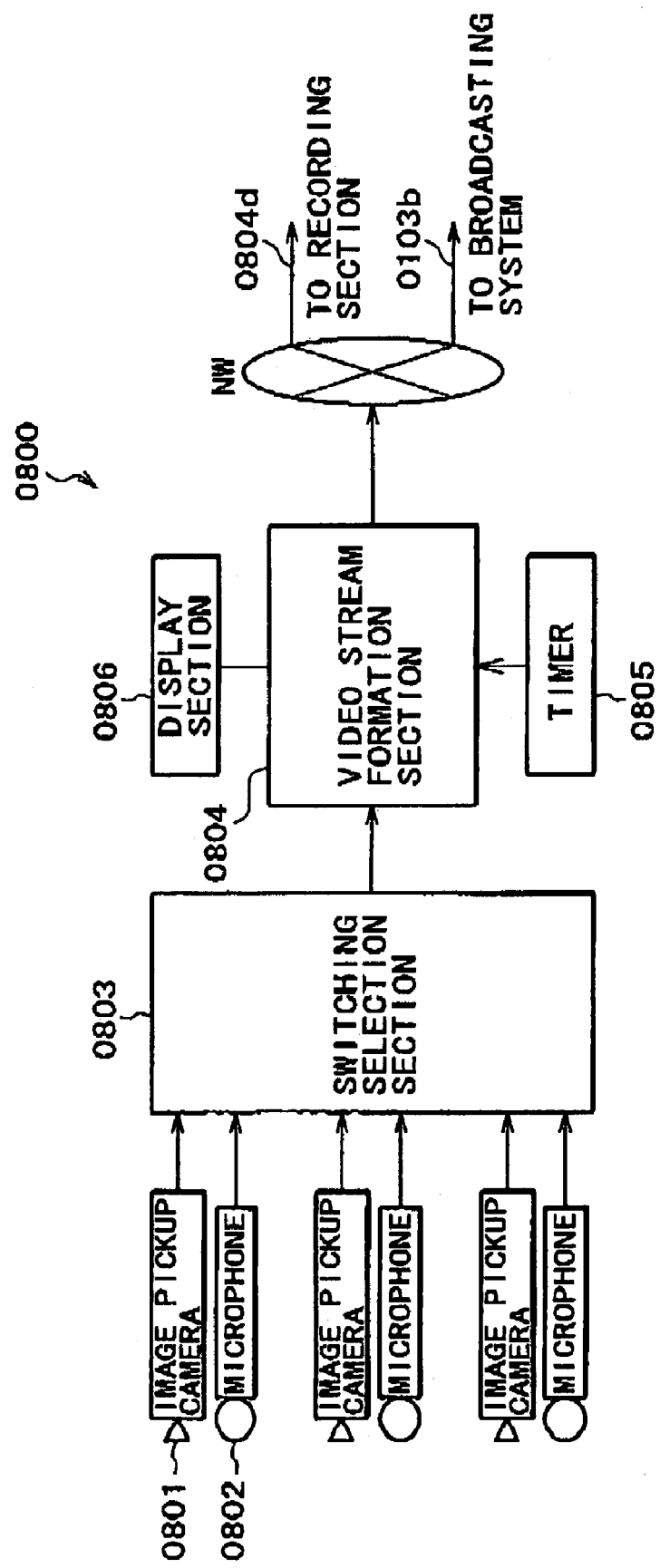
FIG. 8 is a block diagram showing a concept of a form of a material processing section shown in FIG. 1.

FIG. 8 shows a block configuration of a form of the material processing section. Referring to FIG. 8, the material processing section 0800 includes a switching selection section 0803 for selectively outputting one of video signals from a plurality of image pickup cameras (for example, image pickup cameras 0801) and audio signals from a plurality of microphones (for example, microphones 0802); a video stream formation section 0804 for performing data conversion and so forth to form a video stream; and a monitor 0806 connected to the video stream formation section 0804 for providing a display on a screen. The material processing section 0800 further includes a timer 0805 which functions as a production block for producing first time information or common time information and provides the first time information or common time information to the video stream formation section 0804.

The video stream formation section 0804 forms a video stream 0804*d* (which corresponds to reference character 0103*d* in FIG. 1) to be signaled to the recording section 0105 and a broadcasting video stream 0103*b* to be signaled to the broadcasting system not shown. It is to be noted that, while the video streams are transmitted through the communication network NW, transmission of them is not limited to this and they may be transmitted in different manners.

The video stream formation section 0804 operates in three modes one of which can be selected by an operation of an operator.

In the first mode, the video stream formation section 0804 forms and signals a video stream 0804*d* and a broadcasting video stream 0103*b* to which first time information or common time information is not added. In this instance, the timer 0805 does not operate.

In the second mode, the video stream formation section 0804 adds first time information or common time information to both of the video stream 0804*d* and the broadcasting video stream 0103*b*. In this instance, the timer 0805 operates.

In the third mode, the video stream formation section 0804 adds first time information or common time information to one of the video stream 0804*d* and the broadcasting video stream 0103*b*. In this instance, the timer 0805 operates.

Here, a switching device generally called switcher is applied to the switching selection section 0803. Meanwhile, the video stream formation section 0804, monitor 0806 and timer 0805 are,formed as a computer system having a communication function and includes such components as a processor (CPU), memories such as a RAM and a ROM, an input/output interface (IF) and a bus. However, the components mentioned are components of an ordinary computer system, and therefore, description of them is omitted herein to avoid redundancy.

Figure 9:
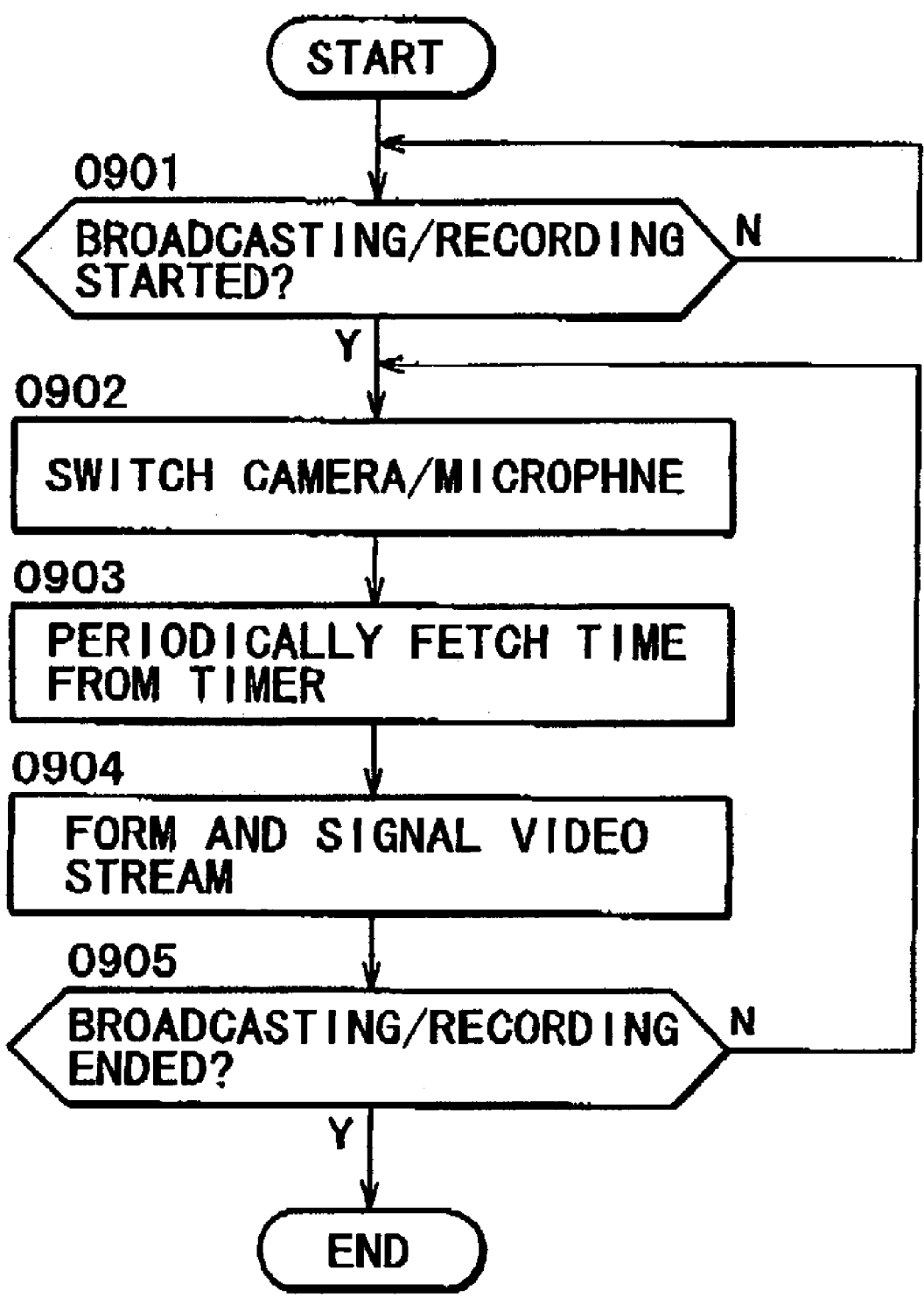
FIG. 9 is a flow chart illustrating operation of the material processing section of FIG. 8.

FIG. 9 illustrates operation of the material processing section 0800 in the second mode. Referring to FIG. 9, after broadcasting or/and recording are started at step 901, video signals from the image pickup cameras 0801 and audio signals from the microphones 0802 are inputted to the switching selection section 0803, and a desired video signal and a desired audio signal are selected through the switching selection section 0803 by the operator and sent to the video stream formation section 0804 at step 902. The video stream formation section 0804 displays the currently selected video signal and audio signal on the monitor 0806, and fetches time data such as the time sent from the timer 0805 and periodically samples the time data at predetermined intervals to produce first time information or common time information (step 903). It is to be noted that, for the convenience of description, the first time information or the common time information is referred to merely as time information. The time information may be a time code which is set, for example, to 00:00:00:00 at a point of time at which recording of the video and audio signals is started.

The video stream formation section 0804 thereafter performs data conversion of the video/audio signals and multiplexes resulting data with the time information to form a video stream 0804d or/and a broadcasting video stream 0103b, which are signaled through the communication network NW. The video stream 0804d is signaled to the recording section 0105 while the video stream 0103b is signaled to the broadcasting system.

If the broadcasting or/and the recording are continued at step 905, then the processing returns to step 902 so that the processes described above are repeated.

Figure 10:
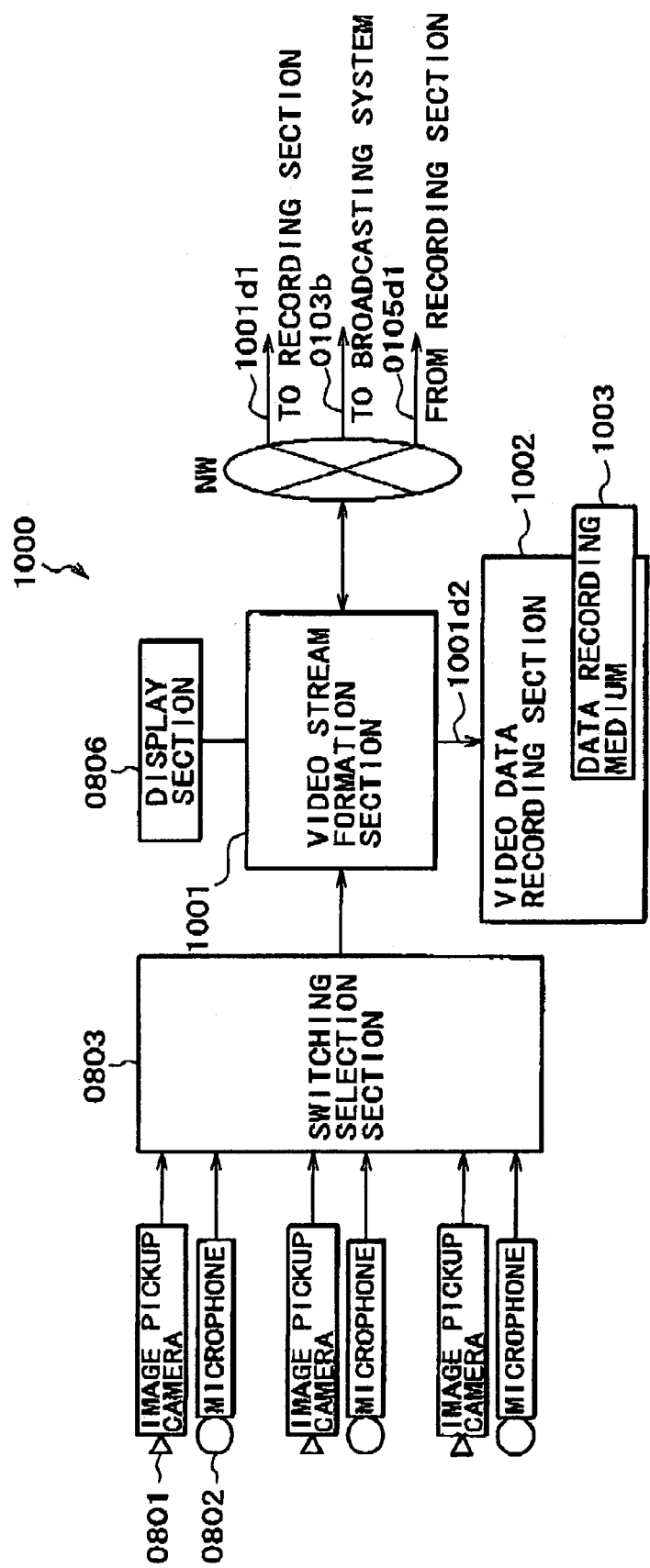
FIG. 10 is a block diagram showing a concept of another form of the material processing section shown in FIG. 1.

FIG. 10 shows,another form of the material processing section 0101 shown in FIG. 1. Referring to FIG. 10, the material processing section 1000 shown is a modification to and includes common components to those of the material processing section 0800 described above with reference to FIG. 8 but is different in that it includes a video stream formation section 1001; and a video data recording section 1002 in place of the video stream formation section 0804 and the timer 0805, respectively. It is to be noted that description of the other common components is omitted herein to avoid redundancy.

The video data recording section 1002 is controlled by the video stream formation section 1001 to perform recording. A removable data recording medium 1003 such as a video tape medium or a removable HDD or a non-removable medium is applied to the video data recording section 1002 so that the video data recording section 1002 has a function of recording and reading out information onto and from the data recording medium 1003.

The video stream formation section 1001 signals a video stream 1001d1 and a video stream 1001d3, to which no time information is added, to the recording section 0105 and the broadcasting system not shown, respectively. Further, the video stream formation section 1001 receives time information 0105d1 from the recording section 0105, forms video data 1001d2 wherein the time information 0105d1 to be matched with the video streams, and sends the video data 1001d2 to the video data recording section 1002 so as to be recorded by the video data recording section 1002. In this manner, the video stream formation section 1001 has a bi-directional communication function and can fetch the time information 0105d1 supplied thereto from the recording section 0105 and record the video data with the time information into the data recording medium 1003 so that the video data with the time information may be stored.

In the following, several forms of the recording section 0105 shown in FIG. 1 are described.

Figure 11:
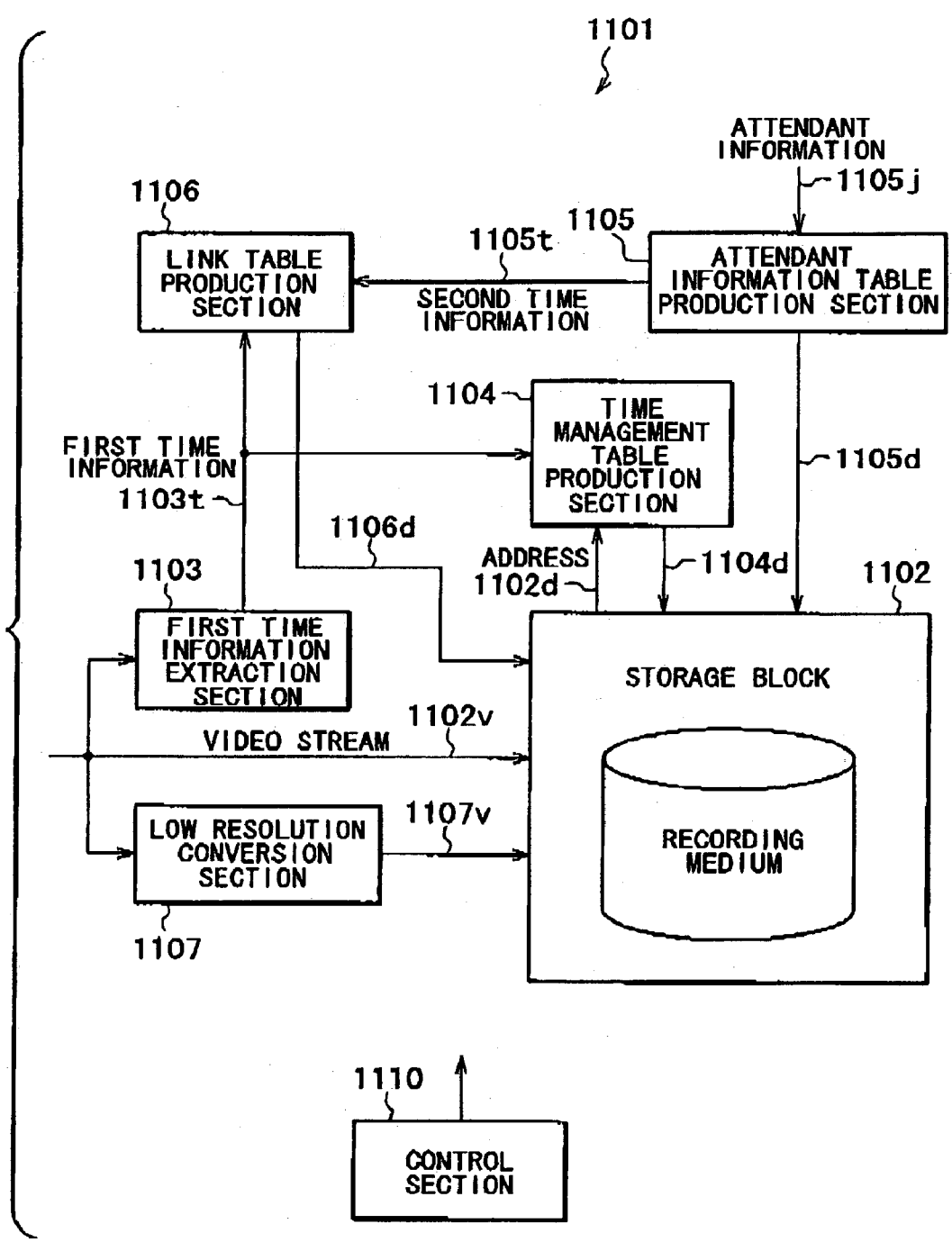
FIG. 11 is a block diagram showing a recording section shown in FIG. 1.

FIG. 11 shows a form of the recording section. Referring to FIG. 11, the recording section 1101 corresponds to the case 1 shown in FIG. 2 and includes a storage block 1102 having the data recording medium 0110 shown in FIG. 1 accommodated therein for controlling recording and storage of various data including a video stream 1102v sent thereto from the material processing section 0103 and having first time information added thereto and table data sent thereto from the pertaining components and outputting address data 1102d; a first time information extraction section 1103 for extracting first time information 1103t from within the video stream 1102v; a time management table production section 1104 for a receiving the address data 1102d and the first time information 1103t to prepare time management table data 1104d wherein they are matched with each other and sending the time management table data 1104d to the storage block 1102; an attendant information table production section 1105 for fetching attendant information 1105j to which second time information is added, for sending second time information 1105t extracted from the attendant information 1105j to a link table production section 1106, for producing attendant information table data 1105d wherein the attendant information and the second time information are matched with each other, and for sending the attendant information table data 1105d to the storage block 1102; a link table production section 1106 for receiving the first time information 1103t and the second time information 1105t to prepare link table data 1106d wherein they are matched with each other and then signaling the link table data 1106d to the storage block 1102; a low resolution conversion section 1107 for fetching and converting the video stream 1102v into a low resolution video stream 1107v and sending the low resolution video stream 1107v to the storage block 1102; and a control section 1110 for controlling operation of the entire recording section 1101.

The control section 1110, first time information extraction section 1103, time management table production section 1104, attendant information table production section 1105, link table production section 1106 and low resolution conversion section 1107 are prepared as computer programs for executing the data recording method of the present invention. The computer programs are stored in a read only memory device (ROM) or/and a data recording apparatus such as a hard magnetic disk apparatus.

The storage block 1102 functions as a database, and the entire recording section 1101 is implemented by application of a computer system such as a combination of a main frame computer, a work station, a server machine and a personal computer. The computer system may be constructed physically in a single computer apparatus or may have a multi-platform configuration composed of a plurality of computer units interconnected by an Intranet or a local area network (LAN).

For example, where the recording section 1101 is constructed in a single computer unit, it includes, in addition to the data recording apparatus such as the ROM or/and the hard magnetic disk apparatus described hereinabove; a central processing unit (CPU) for reading and executing the computer programs; a readable and writable storage device such as a RAM (Random Access Memory) into which data produced during execution of the computer programs by the CPU are temporarily stored; a storage device used as an image memory such as a VRAM (Video RAM); a display section such as a display unit for displaying an image based on image data converted by and signaled from the VRAM; a communication interface section for communication control; an inputting operation section such as a mouse and a keyboard for being operated by an operator, an input/output interface section for controlling inputting and outputting; a bus for interconnecting the CPU, ROM, RAM, VRAM and interfaces mentioned above, and so forth. However, the configuration described is an ordinary computer configuration, and therefore, detailed description thereof is omitted herein to avoid redundancy.

Further, details of the storage block 1102 are hereinafter described.

Now, operation of the recording section 1101 is described with reference to FIGS. 12 and 13.

When the video stream 1102v is inputted to the recording section 1101 at step 1201, the control section 1110 advances its processing to step 1202 and to steps beginning with reference character "A" indicating a branch from step 1201. In the flow charts of FIGS. 12 and 13, the branching flows indicated by reference character "A" in FIG. 12 represent that corresponding processes in the figures are executed in parallel.

At step 1202, the video stream 1102v is sent to the storage block 1102. Then at step 1203, the first time information extraction section 1103 extracts the first time information 1103t from within the video stream 1102v and sends it to the time management table production section 1104 and the link table production section 1106. Thereafter, the processing advances to step 1204 and to a branching step represented by reference character "B".

At step 1204, the time management table production section 1104 produces, based on the sampled first time information 1103t and the address data 1102d received from the storage block 1102, time management table data 1104d wherein they are matched with each other, and sends the time management table data 1104d to the storage block 1102. Thereafter, the processing returns to step 1201.

Figure 12:
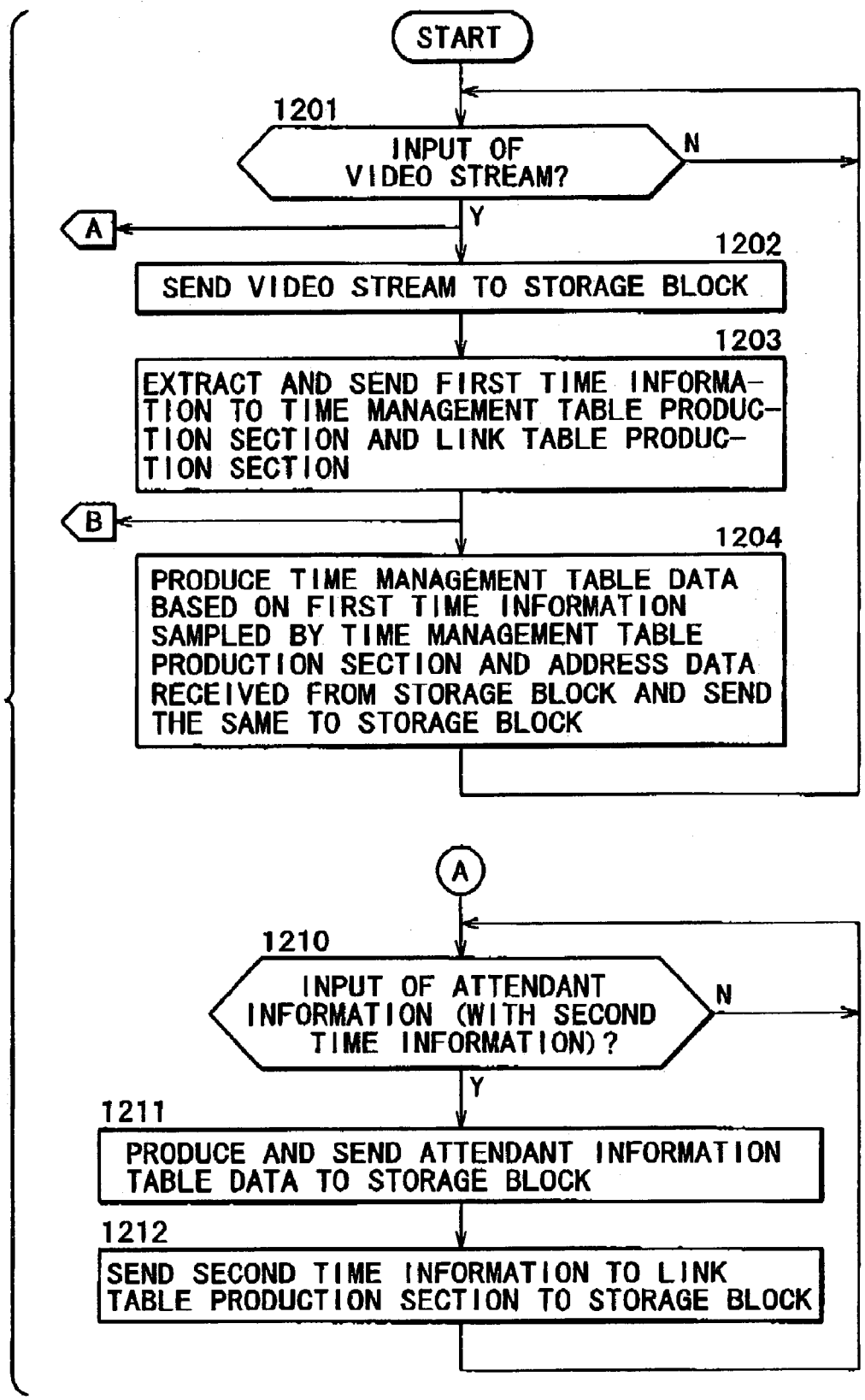
FIGS. 12 and 13 are flow charts illustrating operation of the recording section of FIG. 11.

Meanwhile, in a flow beginning with the reference character "A" shown in FIG. 12, if attendant information 1105j with the second time information is inputted, then the attendant information table production section 1105 fetches it at step 1210, and produces attendant information table data 1105d wherein the attendant information and the second time information are matched with each other and sends the attendant information table data 1105d to the storage block 1102 at step 1211. Then at step 1212, the extracted second time information 1105t is sent to the link table production section 1106, whereafter the processing returns to step 1210.

Figure 13:
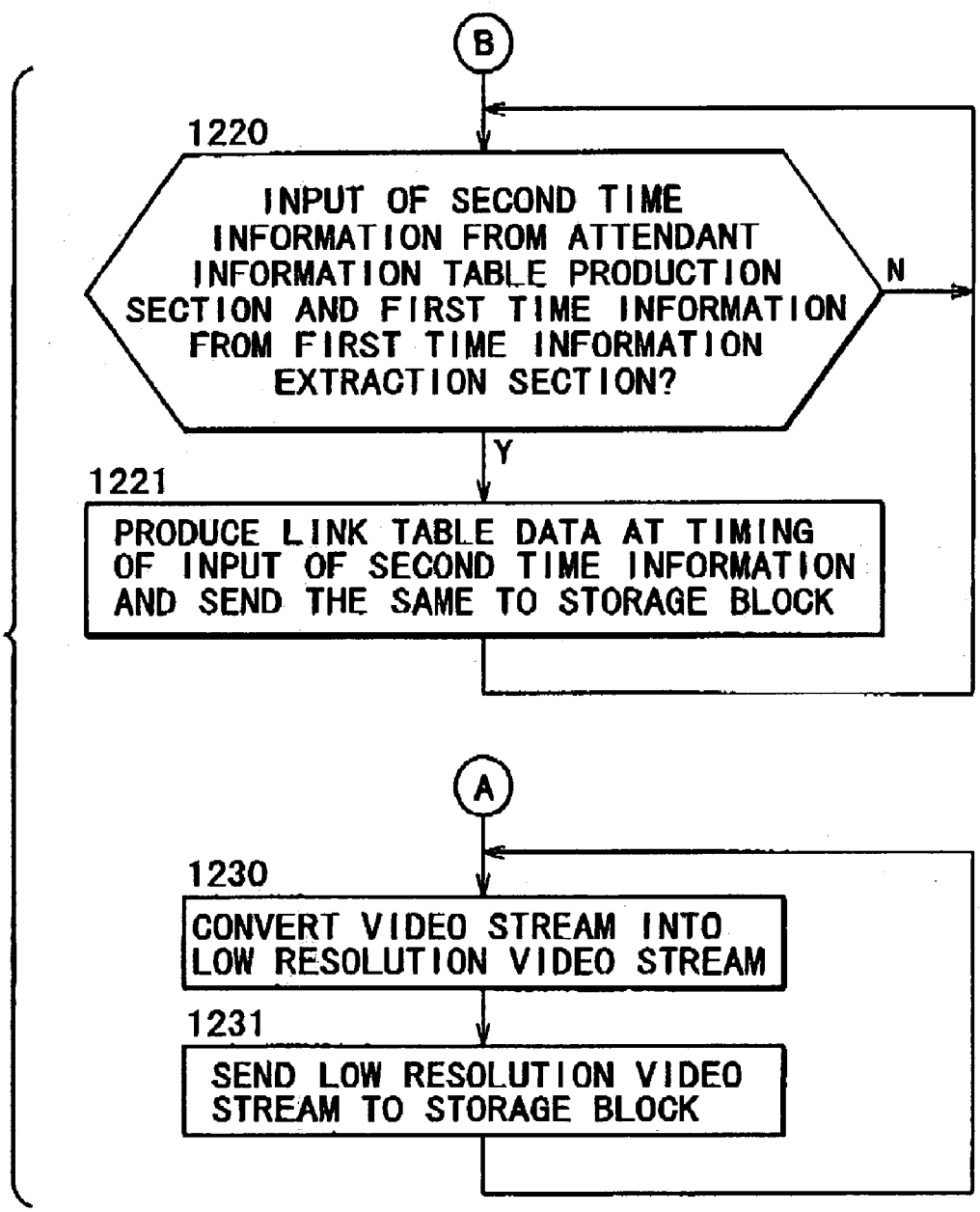

Referring now to FIG. 13, in another flow beginning with the reference character "A", the low resolution conversion section 1107 fetches and converts the video stream 1102v into a low resolution video stream 1107v at step 1230 and sends the low resolution video stream 1107v to the storage block 1102 at step 1231, whereafter the processing returns to step 1230.

On the other hand, in a flow beginning with the reference character "B", if the first time information 1103t is inputted from the first time information extraction section 1103 and the second time information 1105t is inputted from the attendant information table production section 1105 at step 1220, then the link table production section 1106 produces, at step 1221, link table data 1106d wherein the first time information 1103t and the second time information 1105t are matched with each other at the timing at which the second time information 1105t is inputted and sends the produced link table data 1106d to the storage block 1102, whereafter the processing returns to step 1220.

Figure 14:
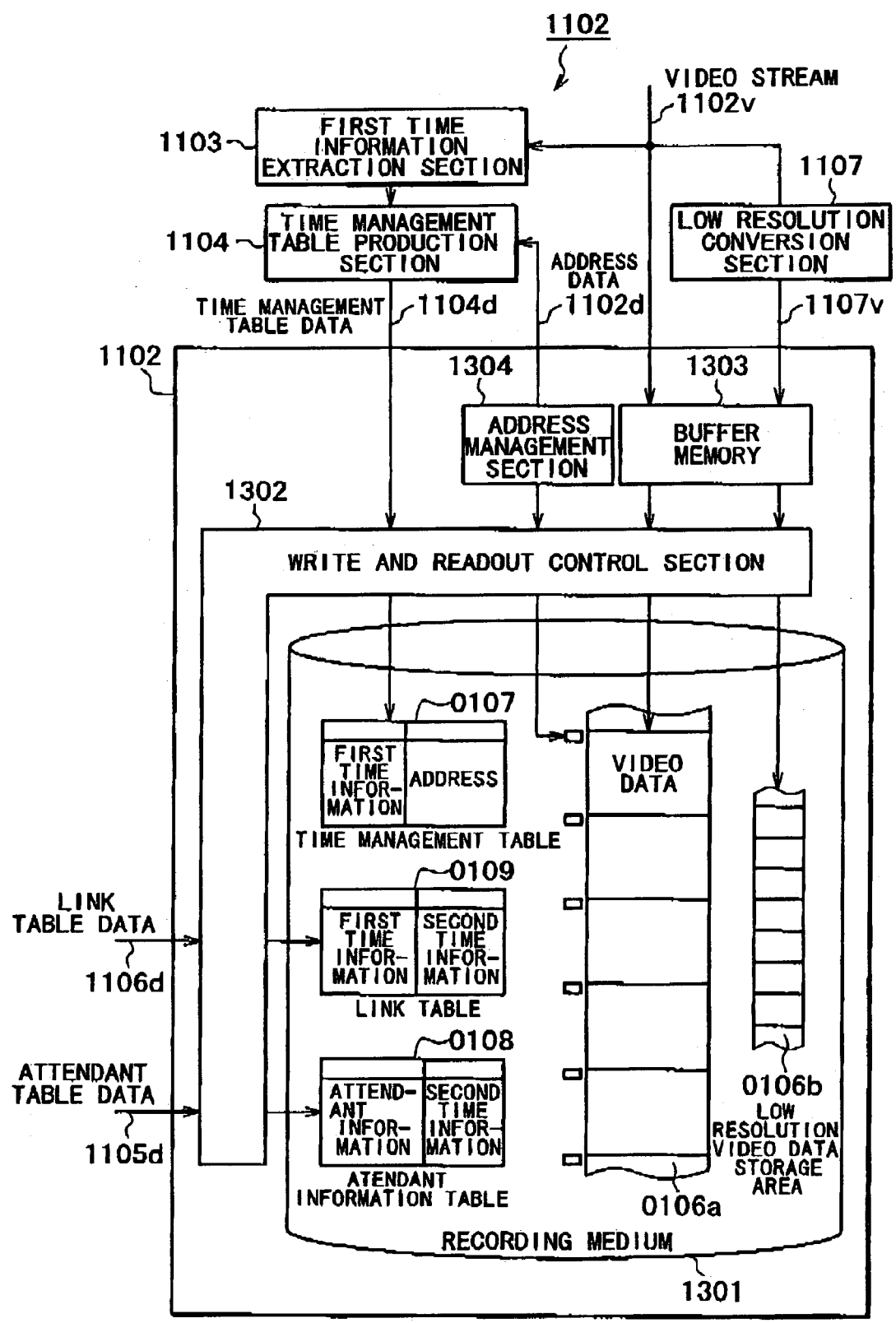
FIG. 14 is a block diagram showing a storage block of the data recording system of FIG. 1.

A block configuration of the storage block 1102 shown in FIG. 11 is shown in FIG. 14. Referring to FIG. 14, the storage block 1102 includes a recording medium 1301 for recording and storing video data and tables; a write and readout control section 1302 for controlling writing and readout to the recording medium 1301; a buffer memory 1303 for video data thud read out, and an address management section 1304 for managing the addresses on the recording medium 1301. The recording medium 1301 corresponds to the data recording medium 0110 shown in FIG. 1 and may be a disk type recording medium such as a hard magnetic disk, a magneto-optical disk or an optical disk, or/and a tape type recording medium such as a video cassette tape.

The write and readout control section 1302 and the address management section 1304 are prepared as computer programs.

The write and readout control section 1302 further controls the buffer memory 1303 to manage buffering of data based on the difference between a transmission rate of the video stream 1102v or/and the low resolution video stream 1107v and a write/readout rate to/from the recording medium 1301. Further, the write and readout control section 1302 controls the address management section 1304 so that video data are written into a pertaining area of the recording medium in accordance with address data determined by the address management section 1304, for example, at the writing timing onto the recording medium 1301. Thereupon, the video stream 1102v is converted into video data and successively recorded into successive segments of the video data storage area 0106a in the data storage area 0106 (refer to FIG. 1) on the recording medium 1301. Meanwhile, the low resolution video stream 1107v is converted into low resolution video data and successively written into successive segments of the low resolution video data storage area 0106b on the recording medium 1301.

The address management section 1304 further sends the address data 1102d to the time management table data production section 1104 at the writing timing described above.

The write and readout control section 1302 receives the time management table data 1104d from the time management table production section 1104 and records the time management table data 1104d into the time management table 0107 placed on the recording medium 1301.

Where the recording medium 1301 is formed from a disk type medium such as a hard magnetic disk, a magneto-optical disk or an optical disk, the following systems are available for recording positions and management of time information, and the present embodiment is ready for all of the systems.

(a) Time information is recorded in the header of each region on a track in which video data are recorded. As an example, time information is recorded in a sub-header part provided in a sector which is formed as a minimum recording management unit on a track. Four to eight bytes or so are prepared for the sub-header part.

(b) Time information is recorded in an independent item in each region on a track on which video data are recorded. As an example, a time information recording region is provided at the top of a data area of a sector such that time information is recorded therein. The time information in this instance may sometimes be called bookmark.

(c) Time information is recorded in the form of a matching table within a management data recording region provided separately from a video stream region in which video data are recorded. As an example, a table of a form wherein time information and absolute addresses (a cluster address and a sector address are recorded in the header part in each sector) on tracks are matched with each other is prepared separately and recorded into a management data recording area. Incidentally, where one sector is formed from 512 bytes and one cluster is formed from 64 sectors, the recording capacity per one cluster is 30 kbytes.

A table of a form wherein time information and frame numbers each formed from one or a plurality of clusters are matched with each other is sometimes prepared. Thus, a matching relationship such as "time information and a sector in a certain cluster" or "time information and a frame" is established in accordance with the recording form as described above. Here, a frame makes a basic unit for construction of each leaf of a moving picture and management is performed based on the total frame number.

On the other hand, recording of time information by a VTR which uses a tape type magnetic recording medium is performed by hierarchical recording of LTC recorded on a longitudinal track formed on a tape medium and VITC recorded on inclined tracks, and the recorded time information can be used also for high speed search, high accuracy positioning and so forth.

Also another configuration may be used wherein a recording starting position SOM is stamped on a tape recording medium such that it is matched with guide data (attendant information).

FIG. 26 illustrates an example of a configuration of the time management table 0107 there a disk type recording medium is applied. The time management table 0107 represents information in the form of a table wherein first time information and addresses are matched with each other and includes records in fields of the first time information, cluster address and sector address. In the example shown, the first time information of the second record is recorded as

11:20:14:05:01 the cluster address (6 bytes) is recorded as h00000000001E in hexadecimal notation, and the sector address (1 byte) is recorded as h00 in hexadecimal notation.

The write and readout control section 1302 further receives the attendant information table data 1105*d* from the attendant information table production section 1105 and records the attendant information table data 1105*d* into the attendant information table 0108 placed on the recording medium 1301.

FIG. 27 shows an example of a configuration of the attendant information table 0108. The attendant information table 0108 represents table type information wherein attendant information and second time information are matched with each other. This attendant information table 0108 includes records in fields of the attendant information and the second time information. In the example shown, the attendant information of the first record is recorded as "start of game"

and the second time information corresponding to this is represented as an elapsed period of time and recorded as

00:00:00

The write and readout control section 1302 further receives the link table data 1106*d* from the link table production section 1106 and records the link table data 1106*d* into the link table 0109 placed on the recording medium 1301.

FIG. 28 shows an example of a configuration of the link table 109. The, link table 109 represents table type information wherein first time information and second time information are matched with each other, and includes records in fields of the first time information and the second time information. In the example shown, the first time information of the third record is recorded as

11:20:14:05:32 and the second time information corresponding to this is represented as an elapsed period of time and is recorded as

00:00:32

Figure 15:
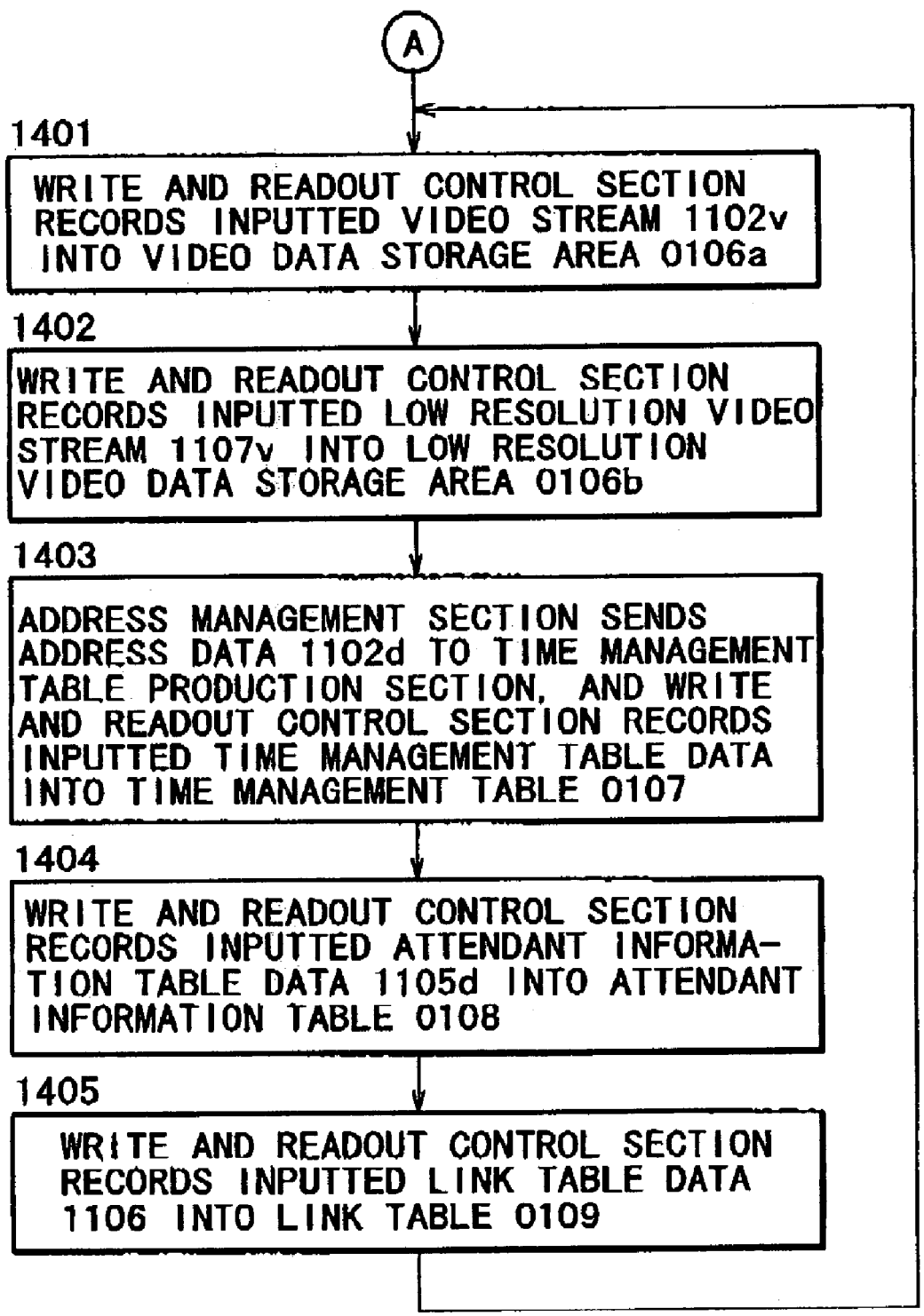
FIG. 15 is a flow chart illustrating operation of the storage block of FIG. 15.

Now, operation of the storage block 1102 is described with reference to FIG. 15. At step 1401, the write and readout control section 1302 fetches the video stream 1102*v* through the buffer memory 1303 and records the video stream 1102*v* into the video data storage area 0106*a*. At step 1402, the write and readout control section 1302 fetches the low resolution video stream 1107*v* through the buffer memory 1303 and records the low resolution video stream 1107*v* into the low resolution video data storage area 0106*b*.

At step 1403, the address management section 1304 sends the address data 1102*d* to the time management table data production section 1104, and the write and readout control section 1302 records the time management table data 1104*d* inputted from the time management table data production section 1104 into the time management table 0107 on the recording medium 1301.

Then at step 1404, the write and readout control section 1302 records the attendant information table data 1105*d* inputted from the attendant information table production section 1105 into the attendant information table 0108 on the recording medium 1301.

Then at step 1405, the write and readout control section 1302 records the link table data 1106*d* inputted from the link table production section 1106 into the link table 0109 on the recording medium 1301. Thereafter, the processing returns to step 1401.

Figure 16:
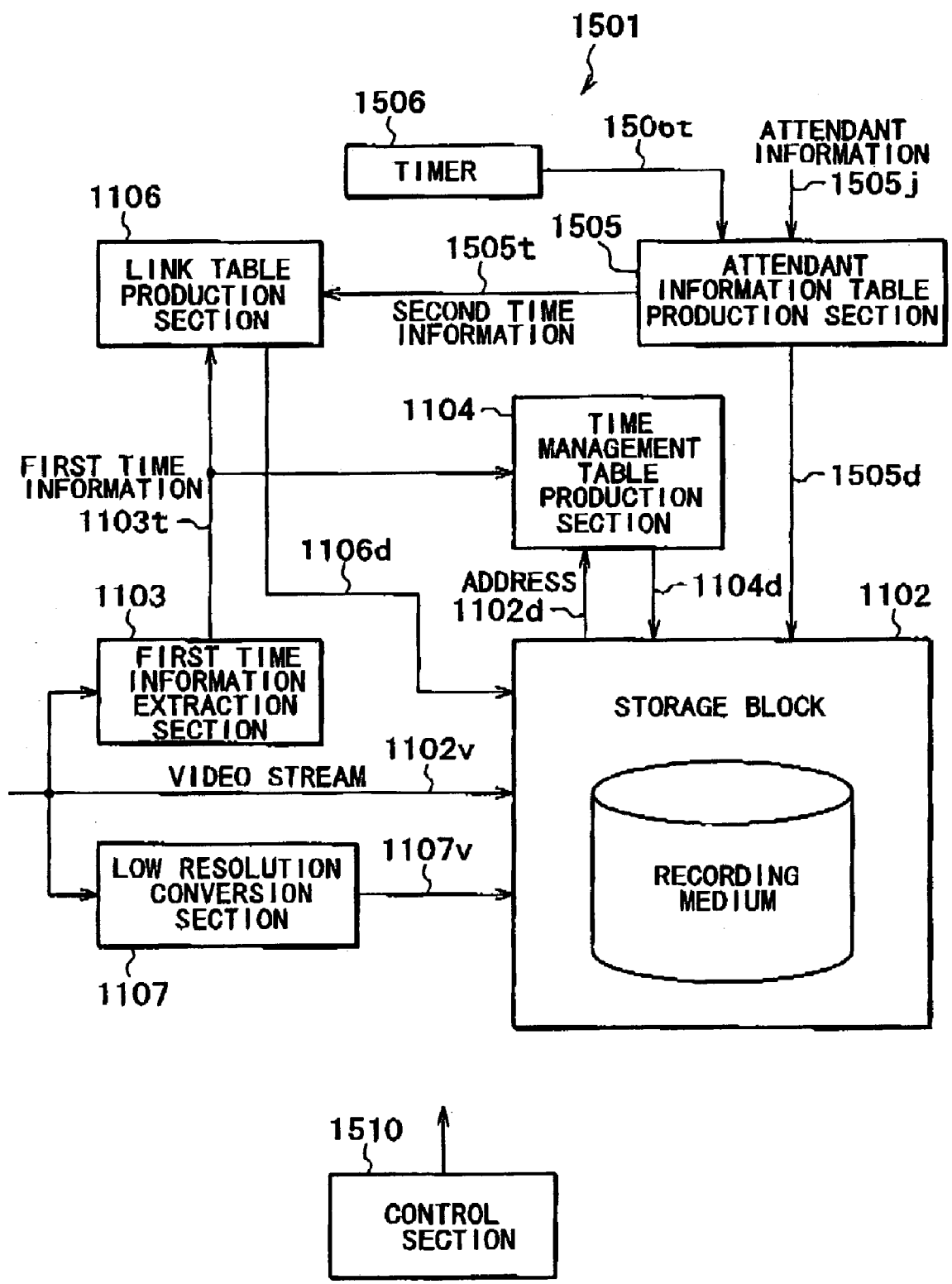
FIG. 16 is a block diagram showing another form of the recording section shown in FIG. 1.

FIG. 16 shows another form of the recording section. Referring to FIG. 16, the recording section 1501 corresponds to the case 2 shown in FIG. 2 and includes a storage block 1102 having the data recording medium 0110 shown in FIG. 1 accommodated therein for controlling recording and storage of various data including a video stream 1102*v* sent thereto from the material processing section 0103 and having first time information stamped thereto, and table data sent thereto from the pertaining components and outputting address data 1102*d*; a first time information extraction section 1103 for extracting first time information 1103*t* from within the video stream 1102*v*; a time management table production section 1104 for receiving the address data 1102*d* and the first time information 1103*t* to prepare time management table data 1104*d* wherein they are matched with each other and sending the time management table data 1104*d* to the storage block 1102; a timer 1506 for generating time data 1506*t* to be used as second time information; an attendant information table production section 1505 for fetching attendant information 1505*j* to which second time information is not added, for sending time data 1506*t* sampled at a timing of such reading as second time information 1505*t* to the link table production section 1106, for producing attendant information table data 1505*d* wherein the attendant information and the second time information are matched with each other, and for sending the attendant information table data 1505*d* to the storage block 1102; a link table production section 1106 for receiving the first time information 1103*t* and the second time information 1505*t* to prepare link table data 1106*d* wherein they are matched with each other and then signaling the link table data 1106*d* to the storage block 1102; a low resolution conversion section 1107 for fetching and converting the video stream 1102*v* into a low resolution video stream 1107*v* and sending the low resolution video stream 1107*v* to the storage block 1102; and a control section 1510 for controlling operation of the entire recording section 1501.

Figure 17:
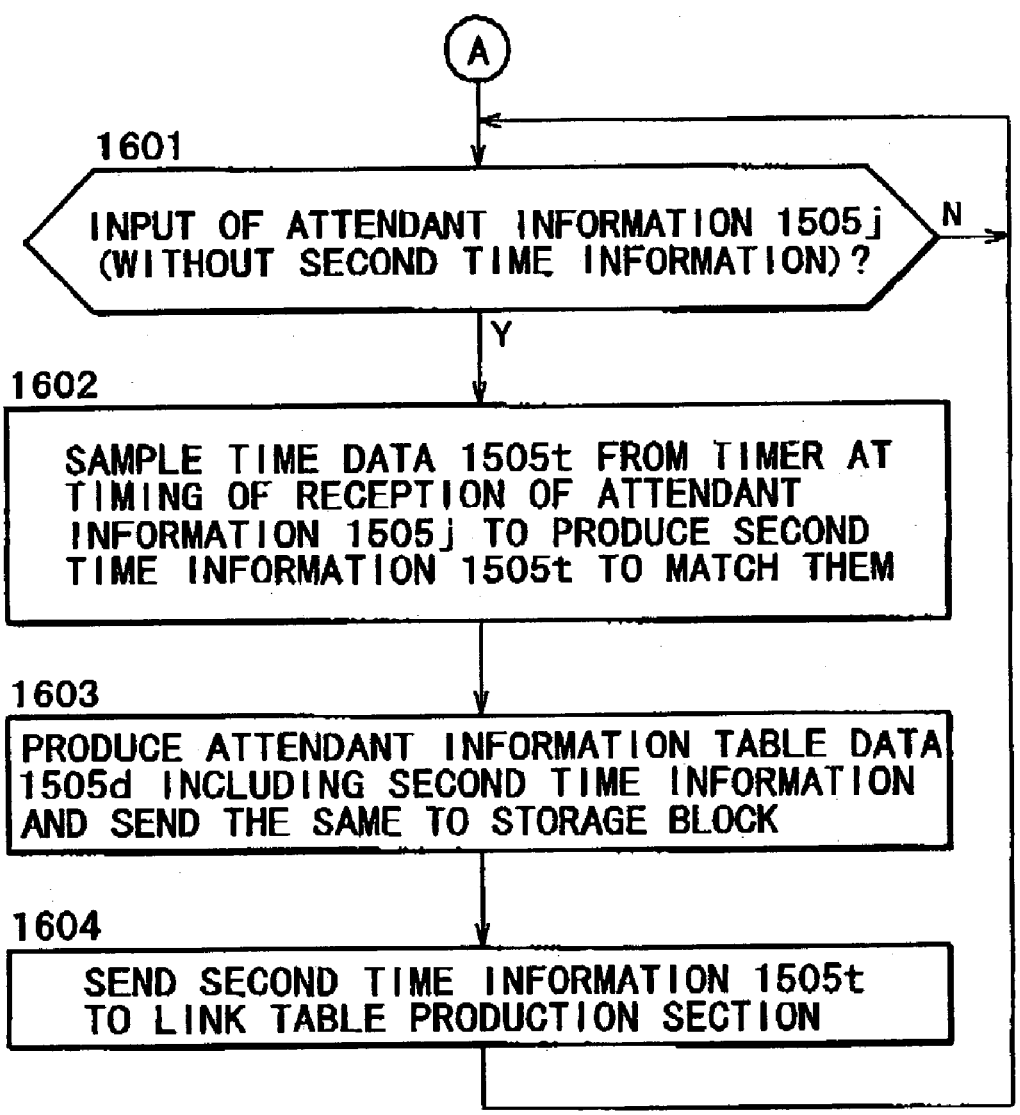
FIG. 17 is a flow chart illustrating operation of the storage block of FIG. 16.

The recording section 1501 operates similarly to the recording section 1101 of FIG. 11 except that, while the recording section 1101 operates in such a manner as described hereinabove with reference FIGS. 12 and 13, the recording section 1501 executes steps 1601 to 1604 illustrated in FIG. 17 in place of the steps 1201 to 1212 of FIG. 12. Thus, operation of the recording section 1501 is described below with reference to FIG. 17.

In the flow beginning with reference character "A", the attendant information table production section 1505 confirms, at step 1601, whether or not attendant information 1505*j* (having no second time information added thereto) is inputted. If attendant information 1505*j* is inputted, then the attendant information table production section 1505 samples the second time information 1506*t* from the timer 1506 at the timing at which the attendant information 1505*j* is received to produce second time information 1506*t* at step 1602.

Then at step 1603, the attendant information table production section 1505 produces attendant information table data 1505*d* wherein the attendant information 1505*j* and,the second time information 1506*t* are matched with each other and sends the attendant information table data 1505*d* to the storage block 1102. Then at step 1604, the extracted second time information 1506*t* is sent to the link table production section 1106, whereafter the processing returns to step 1601.

Figure 18:
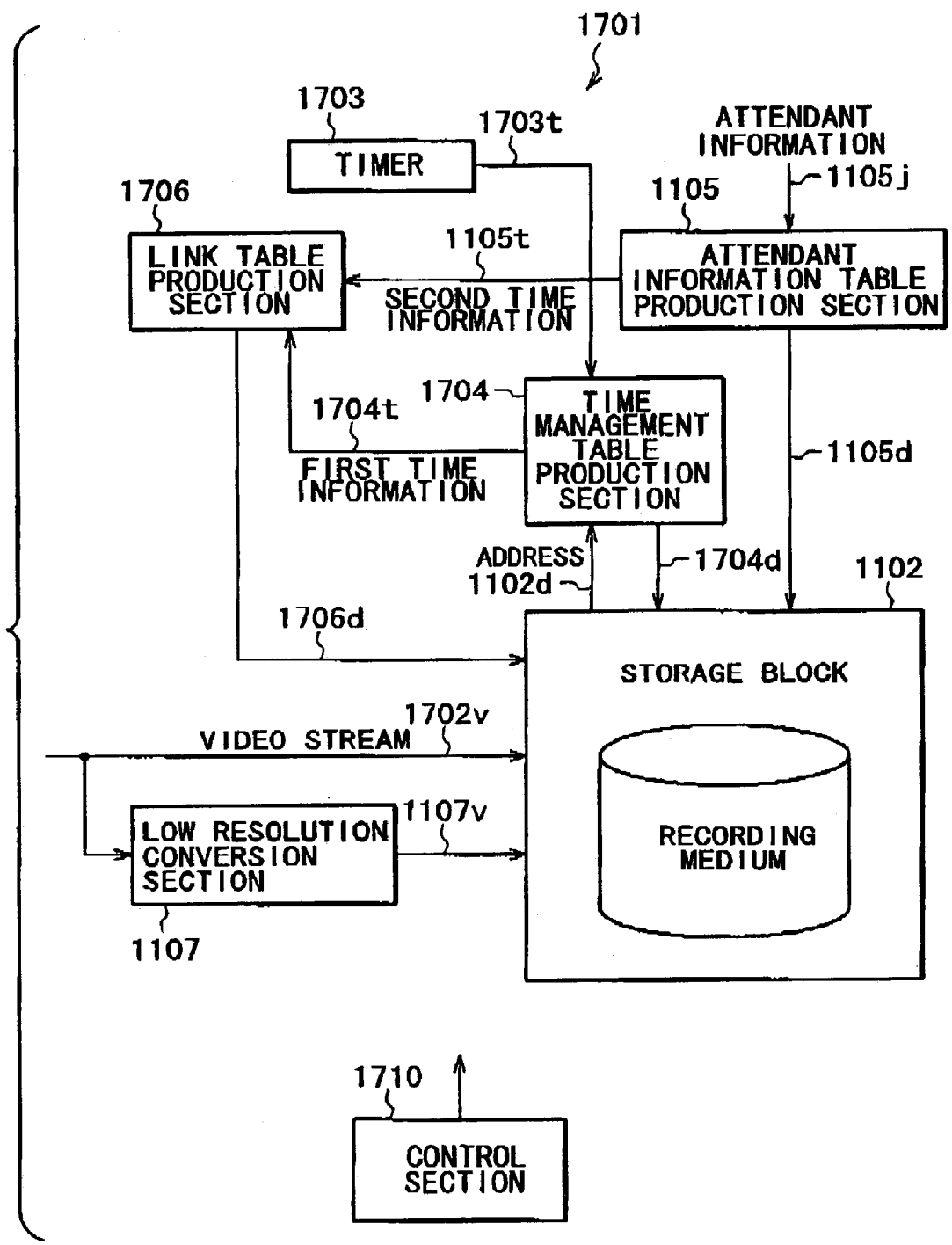
FIG. 18 is a block diagram showing a further form of the recording section shown in FIG. 1.

FIG. 18 shows a further form of the recording section. Referring to FIG. 18, the recording section 1701 corresponds to the case 3 shown in FIG. 2 and includes a storage block 1102 having the data recording medium 0110 shown in FIG. 1 accommodated therein for controlling recording and storage of various data including a video stream 1702*v* sent thereto from the material processing section 0103 and having no first time information added thereto, and table data sent thereto from the pertaining components and outputting address data 1102*d*; a timer 1703 for generating time data 1703*t* to be used as first time information; a time management table production section 1704 for sampling the time data 1703*t* at predetermined intervals to produce first time information 1704*t*, for receiving the address data 1102*d* to produce time management table data 1704*d* wherein the first time information 1704*t* and the address data 1102*d* are matched with each other, and for sending the time management table data 1704*d* to the storage block 1102 and sending the first time information 1704*t* to a link table production section 1706; an attendant information table production section 1105 for fetching attendant information 1505*j* to which the second time information is added to extract the second time information 1105*t* and seeding the second time information 1105*t* to the link table production section 1706 and for producing attendant information table data 1105*d* wherein the attendant information and the second time information are matched with each other and sending the attendant information table data 1105*d* to the storage block 1102; a link table production section 1706 for receiving the first time information 1704*t* and the second time information 1105*t* to prepare link table data 1706*d* wherein they are matched with each other and then sending the link table data 1706*d* to the storage block 1102; a low resolution conversion section 1107 for fetching and converting the video stream 1702*v* into a low resolution video stream 1107*v* and sending the low resolution video stream 1107*v* to the storage block 1102, and a control section 1710 for controlling operation of the entire recording section 1701.

Figure 19:
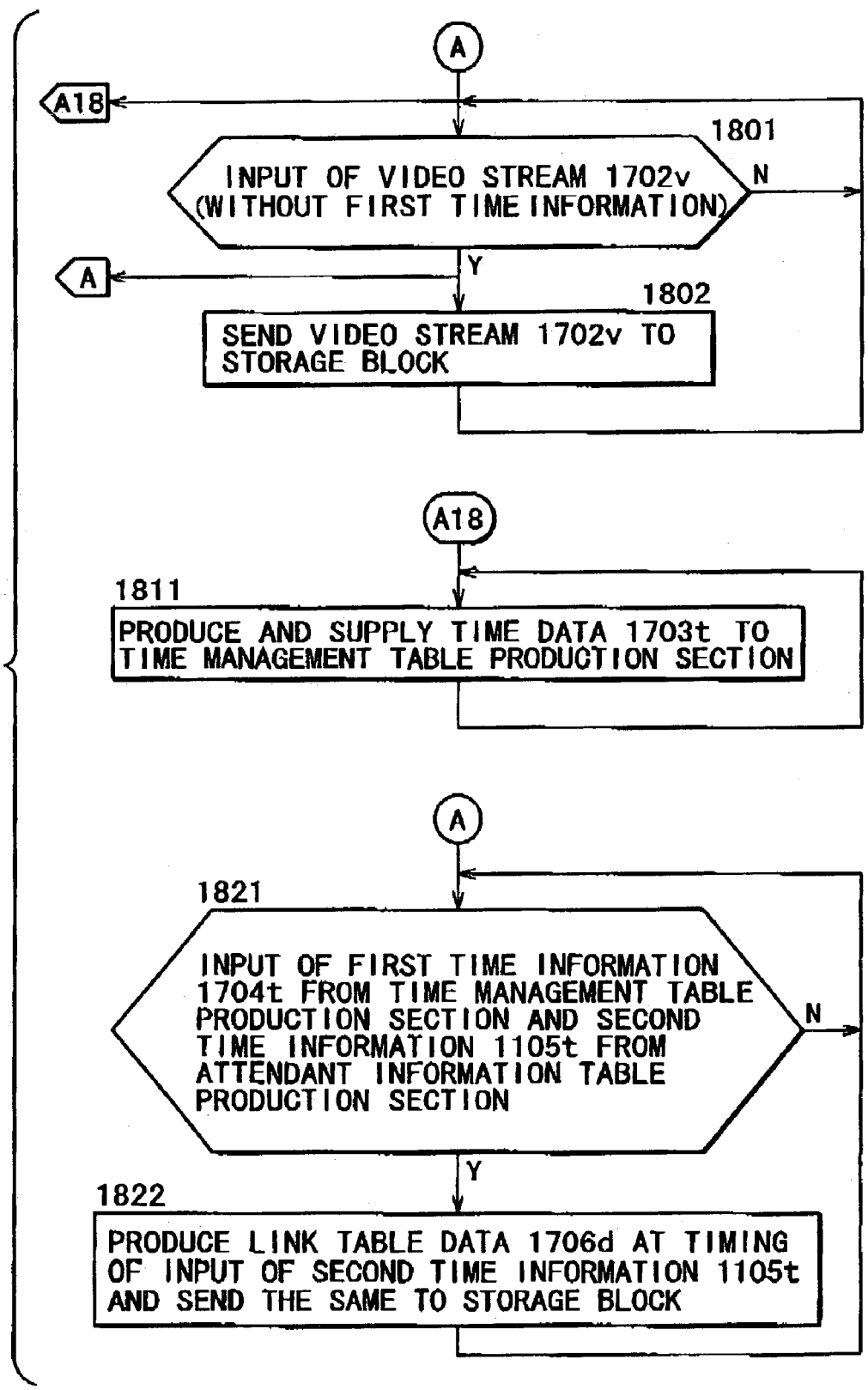
FIGS. 19 and 20 are flow charts illustrating operation of the recording section of FIG. 18.
Figure 20:
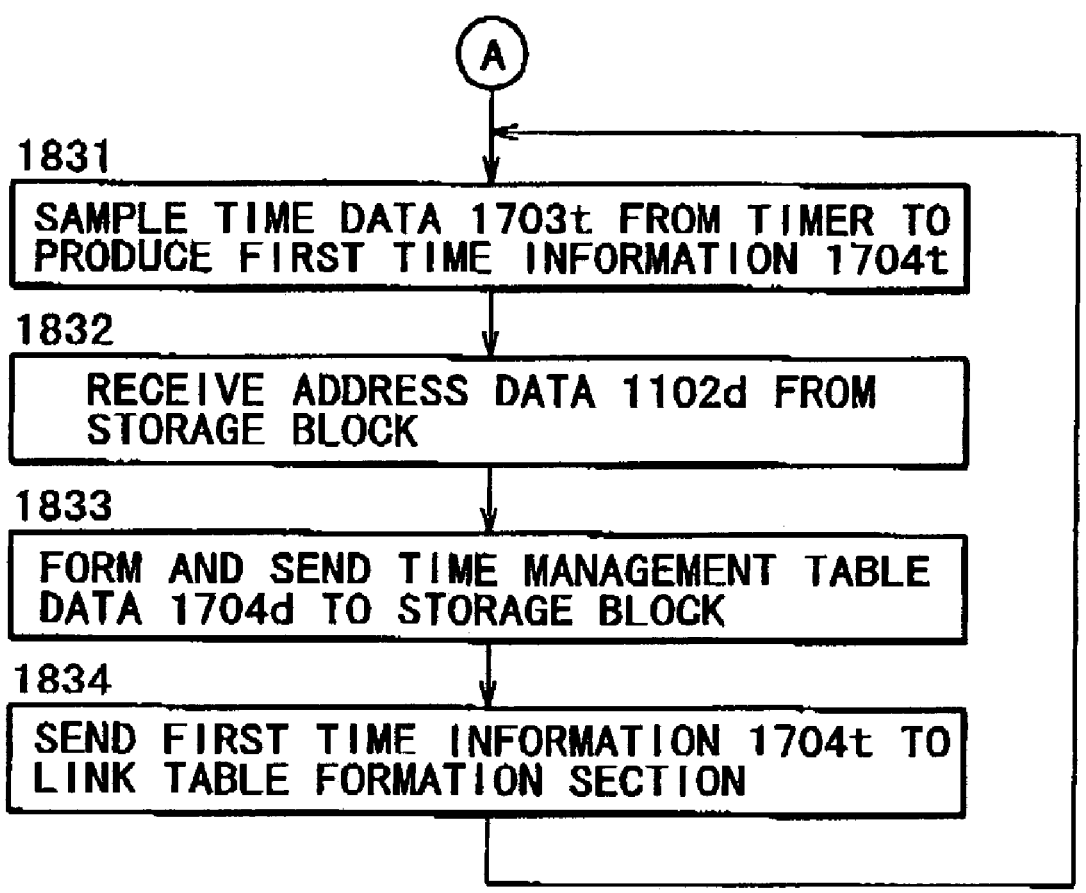

Operation of the recording section 1701 is described with reference to FIGS. 19 and 20.

After the control section 1710 starts its operation, the processing is branched to step 1801 and steps beginning with reference character "A18". In the flow charts of FIGS. 19 and 20, the branching flows indicated by reference character "A18" or "A" represent that corresponding processes in the figures are executed in parallel.

If a video stream 1702*v* (having no first time information added thereto) is inputted at step 1801, then the processing of the control section 1710 advances in a branching manner to step 1802 and to the steps beginning with reference character "A". At step 1802, the control section 1710 sends the video stream 1702*v* to the storage block 1102. Thereafter, the processing returns to step 1801.

On the other hand, in a flow beginning with reference character "A18", the timer 1703 produces and supplies time data 1703*t* to the time management table production section 1704 at step 1811. Thereafter, the timer 1703 repeats the operation at step 1611.

In a flow beginning with reference character "A", processing by the attendant information table production section 1105 is performed. The operation flow, however, is substantially similar to that at steps 1210 to 1212 described hereinabove with reference to FIG. 12. Therefore, overlapping description of the operation of the attendant information table production section 1105 is omitted herein to avoid redundancy. Similarly, an operation flow of the low resolution conversion section 1107 in another flow beginning with reference character "A" is substantially similar to that at steps 1230 to 1213 described hereinabove with reference to FIG. 12. Therefore, overlapping description of the operation of the low resolution conversion section 1107 is omitted herein to avoid redundancy.

On the other hand, in a further flow beginning with reference character "A", the time management table production section 1704 samples the time data 1703*t* from the timer 1703 to produce first time information 1704*t* at step 1831. Then, after the time management table production section 1704 receives the address data 1102*d* from the storage block 1102 at step 1832, it produces, based on the first time information 1704*t* and the address data 1102*d*, time management table data 1704*d* wherein they are matched with each other, and sends the time management table data 1704*d* to the storage block 1102 at step 1833. Then at step 1834, the time management table production section 1704 sends the first time information 1704*t* to the link table production section 1706. Thereafter, the processing returns to step 1831 so that the time management table production section 1704 repeats the processes described above.

In a further flow beginning with reference character "A", the link table production section 1706 checks, at step 1821, whether or not the first time information 1704*t* is inputted from the time management table production section 1704 and the second time information 1105*t* is inputted from the attendant information table production section 1705. If they are inputted, then the link table production section 1706 produces link table data 1706*d* wherein the first time information 1704*t* and the second time information 1105*t* are matched with each other at the timing at which the second time information 1105*t* is inputted and sends the link table data 1706*d* to the storage block 1102 at step 1822. Thereafter, the processing returns to step 1821 so that the processes described above are repeated.

The different forms corresponding to the cases 1 to 3 described hereinabove are explained in summary. While video data are recorded into a recording medium, a time management table which indicates a matching relationship between the video data and first time information which is based on a first time base, attendant information itself which is generated in parallel to the video data, an attendant information table which indicates a matching relationship between the attendant information and second time information which is based on a second time base and a link table which indicates a matching relationship between the first time base and the second time base or between the first time information and the second time information are recorded into the same recording medium or another data recording medium.

Consequently, the attendant information and the video data can be recorded such that any of the video data can be specified from the corresponding attendant information through the intervention of the tables. In particular, in order to utilize the recorded data, second time information is acquired based on the attendant information using the attendant information table, and then corresponding time information is acquired using the link table, whereafter the time management table is used to acquire desired video data.

Further, the first time base which is a scale for the first time information to be matched with the video data and the second time base which is a scale for the second time information to be matched with the attendant information can be set as different arbitrary time bases. Consequently, the first and second time bases can be separated into a time base for recording of the video data and another time base for recording of the attendant information, and this allows further wide application forms.

Further, the attendant information and the video data can be managed independently of each other. Particularly where the attendant information and the video data are recorded into different data recording media from each other, then not only the data recording media can be managed independently of each other, but also they can be sold as separate commodities or utilized individually.

Figure 21:
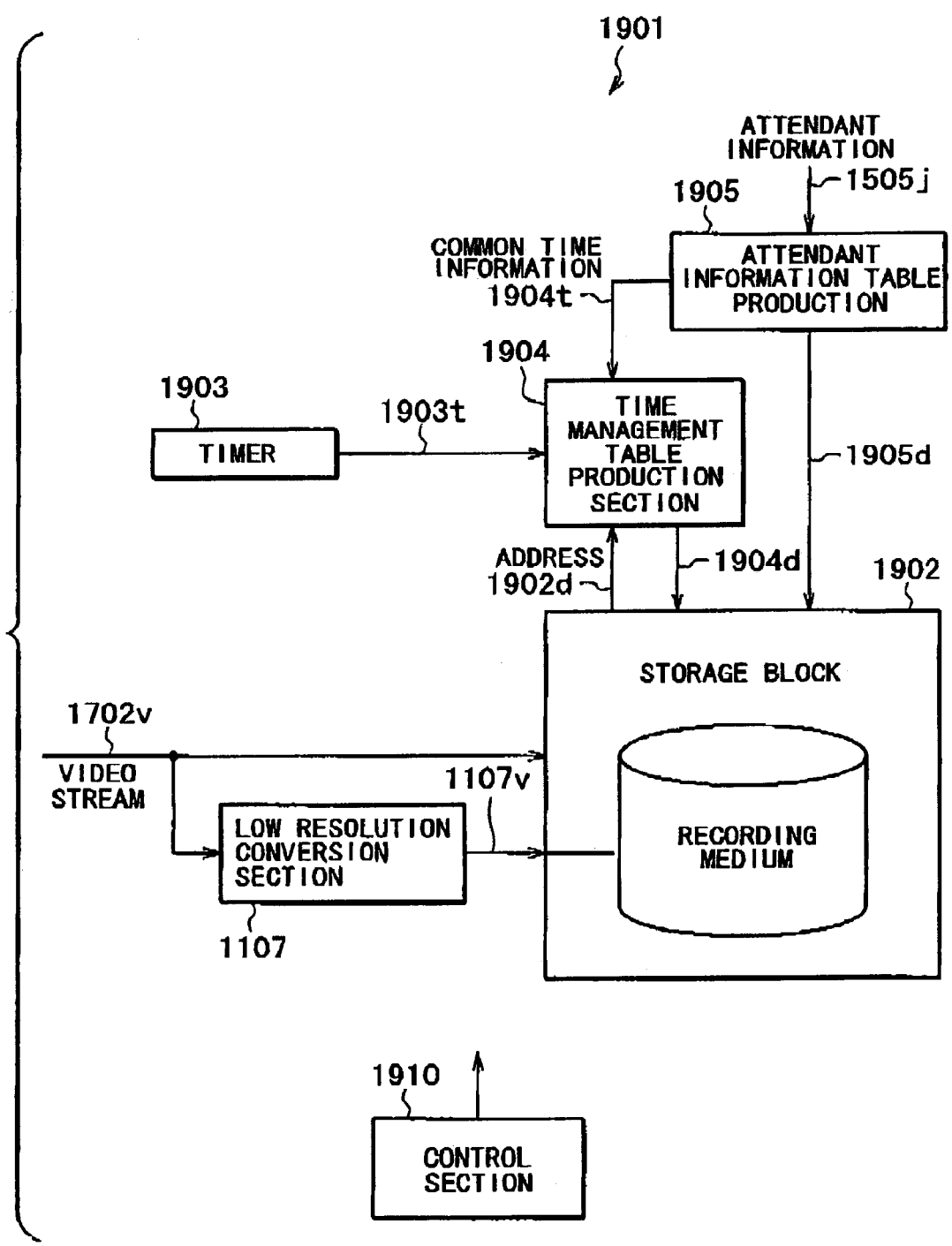
FIG. 21 is a block diagram showing a still further form of the recording section shown in FIG. 1.

FIG. 21 shows a still further form of the recording section which corresponds to the case 4 shown in FIG. 2 and particularly uses common time information.

Referring to FIG. 21, the recording section 1901 shown includes a storage block 1902 having the data recording medium 0110 shown in FIG. 1 accommodated therein for controlling recording and storage of various data including a video stream 1702v sent thereto from the material processing section 0103 and having no first time information added thereto, and table data sent thereto from the pertaining components and outputting address data 1902d; a timer 1903 for generating time data 1903t to be used as common time information; a time management table production section 1904 for sampling the time data 1903t at predetermined intervals to produce common time information 1904t, for supplying the common time information 1904t to an attendant information table production section 1905, for receiving the address data 1902d to produce time management table data 1904d wherein the common time information 1904t and the address data 1902d are matched with each other, and for sending the time management table data 1904d to the storage block 1902; an attendant information table production section 1905 for fetching attendant information 1505j to which no second time information is added and fetching the common time information 1904t supplied thereto, to produce attendant information table data 1905d wherein the attendant information and the common time information are matched with each other and sending the attendant information table data 1905d to the storage block 1902; a low resolution conversion section 1107 for fetching and converting the video stream 1702v into a low resolution video stream 1107v and sending the low resolution video stream 1107v to the storage block 1902; and a control section 1910 for controlling operation of the entire recording section 1901.

The reason why the time management table production section 1904 supplies the common time information 1904t to the attendant information table production section 1905 is that, the frequency of the use of the time data 1903t by sampling it is higher with the time management table production section 1904 than with the attendant information table production section 1905, and that it is intended to make the timings of the time management table production section 1904 and the attendant information table production section 1905 which coincide with each other. Consequently, another configuration wherein the time data 1903t is conversely sampled by the attendant information table production section 1905 resulting in supplying common time information 1904t is supplied to the time management table production section 1904 or a further configuration wherein the timer 1903 supplies the common time information 1904t obtained by being sampled by the timer 1903 itself to the time management table production section 1904 and the attendant information table production section 1905 may be used instead.

Figure 22:
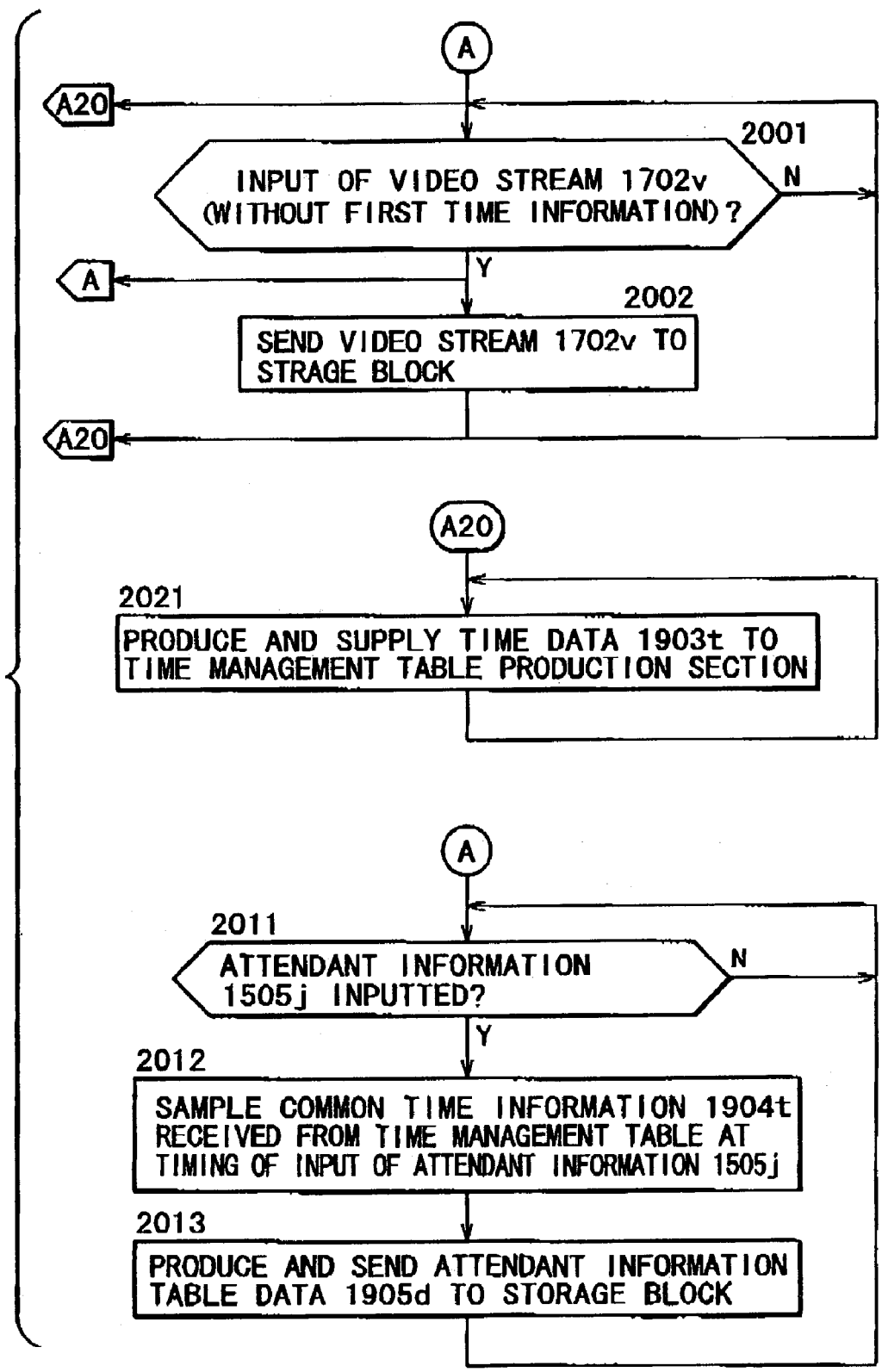
FIGS. 22 and 23 are flow charts illustrating operation of the recording section of FIG. 21.
Figure 23:
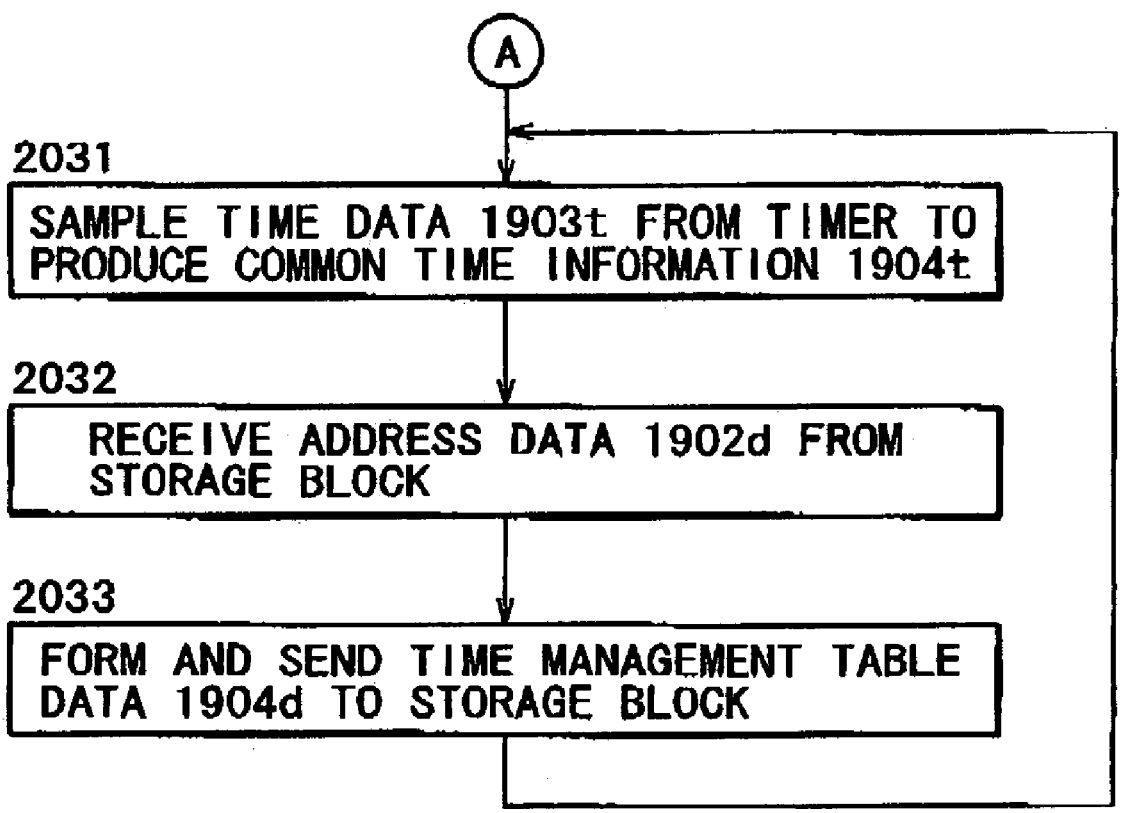

Operation of the recording section 1901 is described with reference to FIGS. 22 and 23.

After the control section 1910 starts its operation, the processing is branched to step 2001 and steps beginning with reference character "A20". In the flow charts of FIGS. 22 and 23, the branching flows indicated by reference character "A" or "A20" represent that corresponding processes in the figures are executed in parallel.

If a video stream 1702v (having no first time information added thereto) is inputted at step 2001, then the processing of the control section 1910 advances in a branching manner to step 2002 and to the steps beginning with reference character "A". At step 2002, the control section 1910 sends the video stream 1702v to the storage block 1902. Thereafter, the processing returns to step 2001.

On the other hand, in a flow beginning with reference character "A20", the timer 1903 produces and supplies time data 1903t to the time management table production section 1904 at step 2011. Thereafter, the timer 1903 repeats the operation at step 2021.

In a flow beginning with reference character "A", the attendant information table production section 1905 checks, at step 2011, whether or not attendant Information 1505j having no second time information added thereto is inputted and fetches, if an input of attendant information 1505j is detected, the attendant information 1505j. Then at step 2012, the attendant information table production section 1905 samples and fetches the common time information 1904t supplied thereto from the time management table production section 1904 at the timing of detection of the attendant information 1505j. Then at step 2013, the attendant information table production section 1905 produces and sends attendant information table data 1905d, wherein the attendant information and the common time information are matched with each other, to the storage block 1902. Thereafter, the processing returns to step 2011.

On the other hand, in another flow beginning with reference character "A", the time management table production section 1904 samples the time data 1903t from the timer 1903 to produce common time information 1904t at step 2031. Then, after the time management table production section 1904 receives the address data 1902d from the storage block 1902 at step 2032, it produces, based on the common time information 1904t and the address data 1102d, time management table data 1904d wherein they are matched with each other, and sends the time management table data 1904d to the storage block 1902 at step 2033. Thereafter, the processing returns to step 2031 so that the processes described above are repeated.

Meanwhile, a flow of operation of the low resolution conversion section 1107 is substantially similar to that at steps 1230 to 1231 described hereinabove with reference to FIG. 12, and overlapping description of the same is omitted herein to avoid redundancy.

Figure 24:
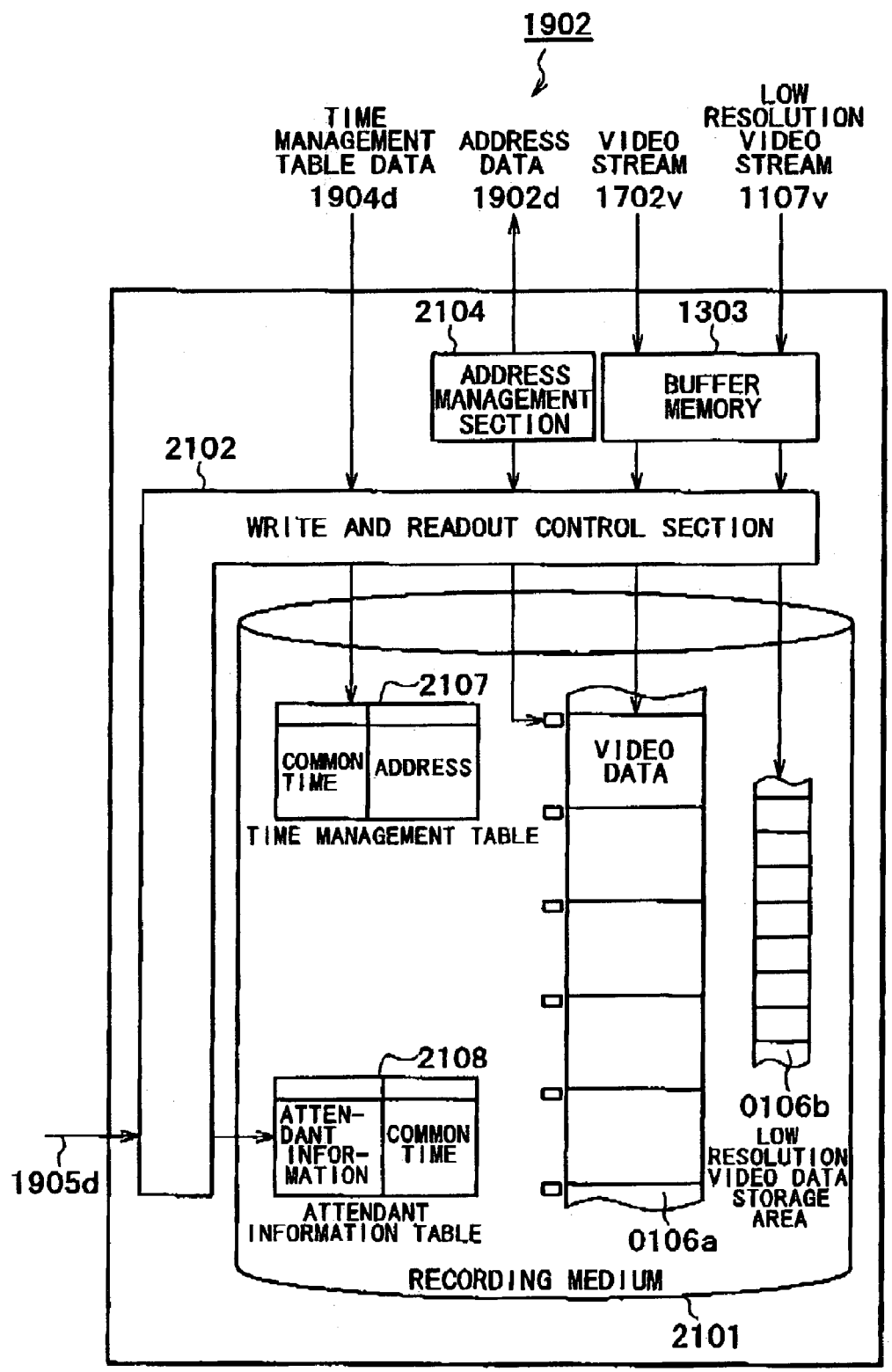
FIG. 24 is a block diagram showing another form of the storage block shown in FIG. 1.

A block configuration of the storage block 1902 shown in FIG. 21 is shown in FIG. 24. Referring to FIG. 24, the storage block 1902 shown includes a recording medium 2101 for recording and storing video data and tables; a write and readout control section 2102 for controlling writing and reading out of video data or a table into and from the recording medium 2101; a buffer memory 1303 for the video stream 1702v or/and the low resolution video stream 1107v to be written; and an address management section 2104 for managing the addresses on the recording medium 2101.

The write and readout control section 2102 controls the buffer memory 1303 to manage buffering of data. Further, the write and readout control section 2102 controls the address management section 2104 so that video data are written into a pertaining area of the recording medium in accordance with address data determined by the address management section 2104. Thereupon, the video stream 1702v is converted into video data and successively recorded into successive segments of the video data storage area 0106a in the data storage area 0106 on the recording medium 2101. Meanwhile, the low resolution video stream 1107v is converted into low resolution video data and successively written into successive segments of the low resolution video data storage area 0106b on the recording medium 2101.

The address management section 2104 further sends the address data 1902d to the time management table data production section 1904 at the writing timing described above.

The write and readout control section 2102 receives the time management table data 1904d from the time management table production section 1904 and records the time management table data 1104d into the time management table 2107 placed on the recording medium 2101. In the time management table 2107, the common time information 1904t and the address data 1902d are recorded in a paired relationship with each other. The write and readout control section 2102 further receives the attendant information table data 1905d sent thereto from the attendant information table production section 1905 and records the attendant information table data 1905d into the attendant information table 2108 placed on the recording medium 2102. In the attendant information table 2108, the attendant information 1505j and the common time information 1904t are recorded in a paired relationship with each other.

Figure 25:
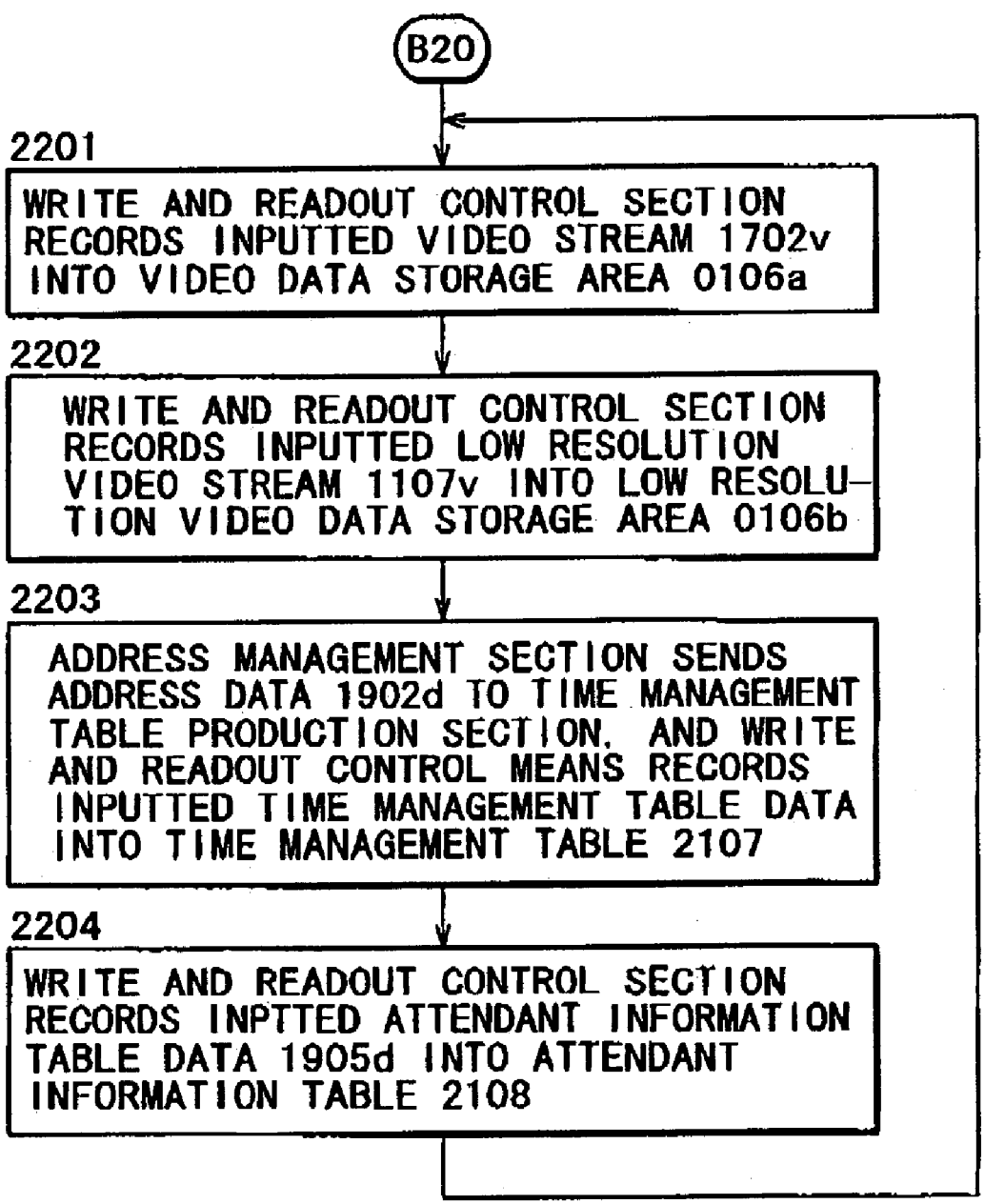
FIG. 25 is a flow chart illustrating operation of the storage block of FIG. 24.

Now, operation of the storage block 1902 is described with reference to FIG. 25. At step 2201, the write and readout control section 2102 fetches the video stream 1702v through the buffer memory 1303 and records the video stream 1702v into the video data storage area 0106a. At step 2202, the write and readout control section 2102 fetches the low resolution video stream 1107v through the buffer memory 1303 and records the low resolution video stream 1107v into the low resolution video data storage area 0106b.

At step 2203, the address management section 2104 sends the address data 1902d to the time management table data production section 1904, and the write and readout control section 2102 records the time management table data 1904d inputted from the time management table data production section 1904 into the time management table 2107 on the recording medium 2101.

Then at step 2204, the write and readout control section 2102 records the attendant information table data 1905d inputted from the attendant information table production section 1905 into the attendant information table 2108 on the recording medium 2101.

Incidentally, while the various forms described above can use, as the method of matching video data and first time information directly with each other, not only matching between "first time information" and "address information" described hereinabove in connection with the time management tables but also matching between "first time information" and "indices of video data". In the latter case, it is possible to determine a pertaining index from first time information and directly search for appertaining index on the medium based on the determined index.

Further, as a method of matching video data and first time information indirectly with each other, matching between "first time information" and "bookmark information of video data" and matching between "bookmark information" and "address information" can be applied.

A concept of common time information is illustrated in FIG. 29. The common time information and the medium addresses illustrated in FIG. 29 are recorded and managed in the time management table, and the attendant information and the common time information illustrated in FIG. 29 are recorded and managed in the attendant information table. Further, at the media addresses, recorded materials (video data) not shown are recorded in a one-by-one corresponding relationship.

Accordingly, a recorded material (video data) can be accessed from attendant information through intervention of common time information.

While the form, described last corresponds to the case 4 described hereinabove with reference to FIG. 2, different forms which apply common time information are described in outline. Upon recording of attendant information to video data which are generated corresponding to the video data, the video data are recorded in a matched relationship with common time information based on a common time base into a data recording medium while the attendant information is recorded into the same data recording medium or some other data recording medium in an associated relationship with the time information. As a result, in order to utilize the recorded data, that video data which corresponds to any piece of the attendant information can be specified readily through the intervention of the common time information matched with the recorded attendant information. Further, where the attendant information is recorded together with the common time information, processing relating to recording of the attendant information is facilitated. Furthermore, the attendant information and the common time information can be recorded into different data recording media at difference places from each other. Thus, for example, upon relaying recording of a sports game, it is possible to record video data onto a data recording medium placed in a broadcasting station together with common time information and record attendant information, which is generated as the relay of the sports game proceeds, into another data recording medium (for example, a memory stick or a flexible disk) together with the common time information using a movable apparatus of the standalone type placed in the stadium.

Figure 30:
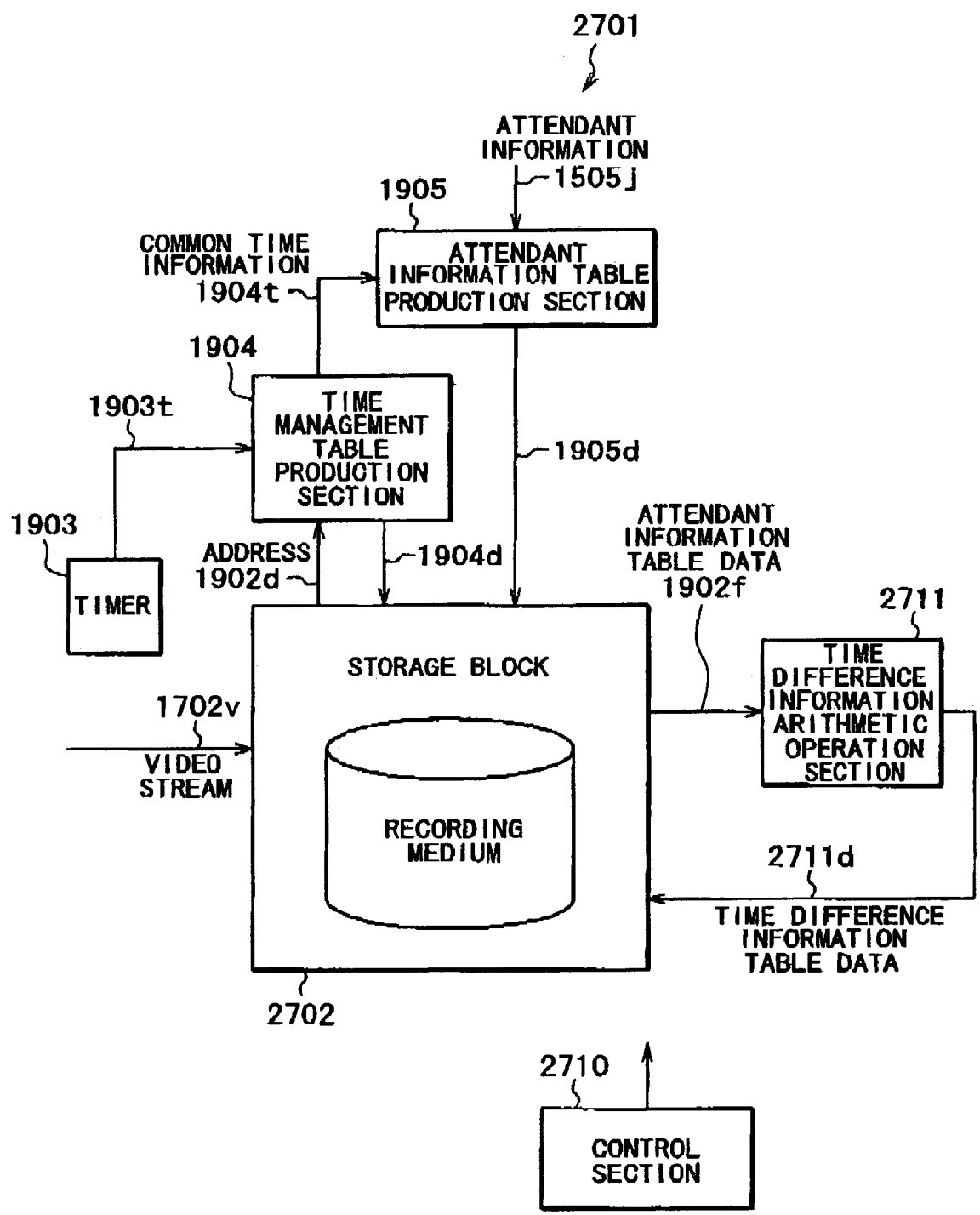
FIG. 30 is a block diagram showing a form of the recording section shown in FIG. 1 which involves time difference arithmetic operation.
Figure 31:
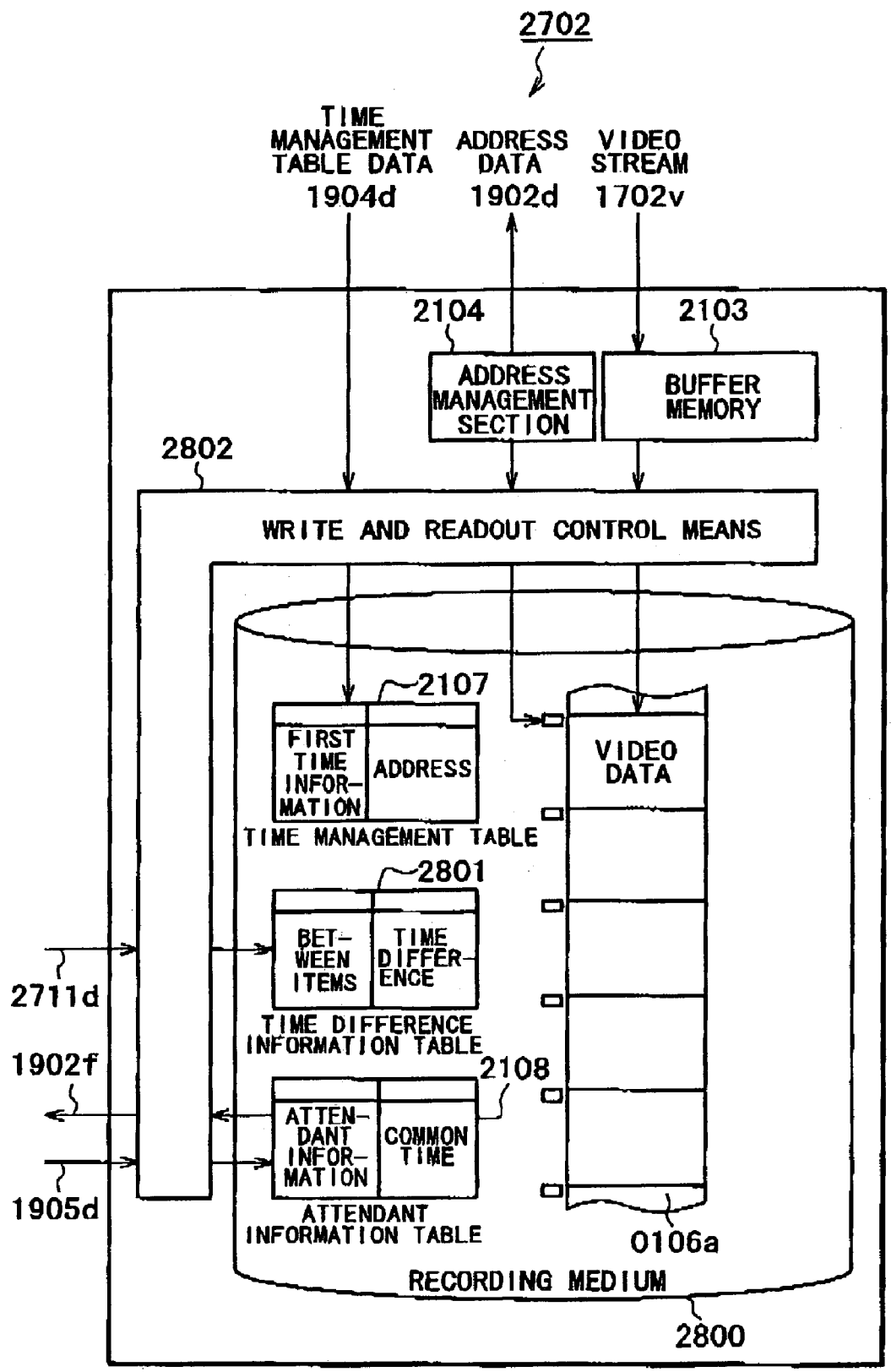
FIG. 31 is a block diagram showing a further form of the storage block shown in FIG. 1.

FIG. 30 shows a yet further form of the recording section which has a time difference arithmetic operation function, and FIG. 31 shows a block configuration of a storage block built in the recording section.

Referring first to FIG. 30, the recording section 2701 shown includes a storage block 2702; a timer 1903; a time management table production section 1904; an attendant information table production section 1905; a time difference information arithmetic operation section 2711; and a control section 2710 for controlling operation of the entire recording section 2701.

The time difference information arithmetic operation section 2711 is prepared as a computer program, and fetches attendant information table data 1902f from an attendant information table 2108 formed in a recording medium 2800 of the storage block 2702 shown in FIG. 31. Then, where a plurality of pieces of attendant information (such pieces may be hereinafter referred to as items) are involved in the attendant information table data 1902f, the time difference information arithmetic operation section 2711 arithmetically operates a difference in time from a certain piece of attendant information to a next piece of attendant information based on the time information, and sends the time difference as time difference information table data 2711d to the storage block 2702. The time difference information table data 2711d include intervals of time between such items as described above and time difference data within the intervals.

A write and readout control section 2802 of the storage block 2702 receives the time difference information table data 2711d and records them as a time difference information table 2801 into the recording medium 2800.

The time difference information table 2801 is referred to upon utilization to facilitate, based on the magnitude of the difference in time from a certain piece of attendant information to a subsequently generated piece of attendant information, estimation of contents occurring within the period.

For example, where, in a relay of a baseball game, a piece of attendant information is generated after each change in count (strike or ball), since, when the game is proceeding normally, the change in count generally occurs after lapse of an average period of time, the time difference between a certain piece of attendant information and a next piece of attendant information generally also exhibits an average period of time. However, if a particularly long difference in time appears between adjacent pieces of attendant information, then if this is checked upon utilization, it can be estimated that some abnormal event in the game (for example, changing of the pitcher, interruption by rain, or interruption by occurrence of an affair such as a protest to the umpire for a long period of time or a confused fight) has occurred. This is effective in later utilization, particularly in an editing operation.

Figure 32:
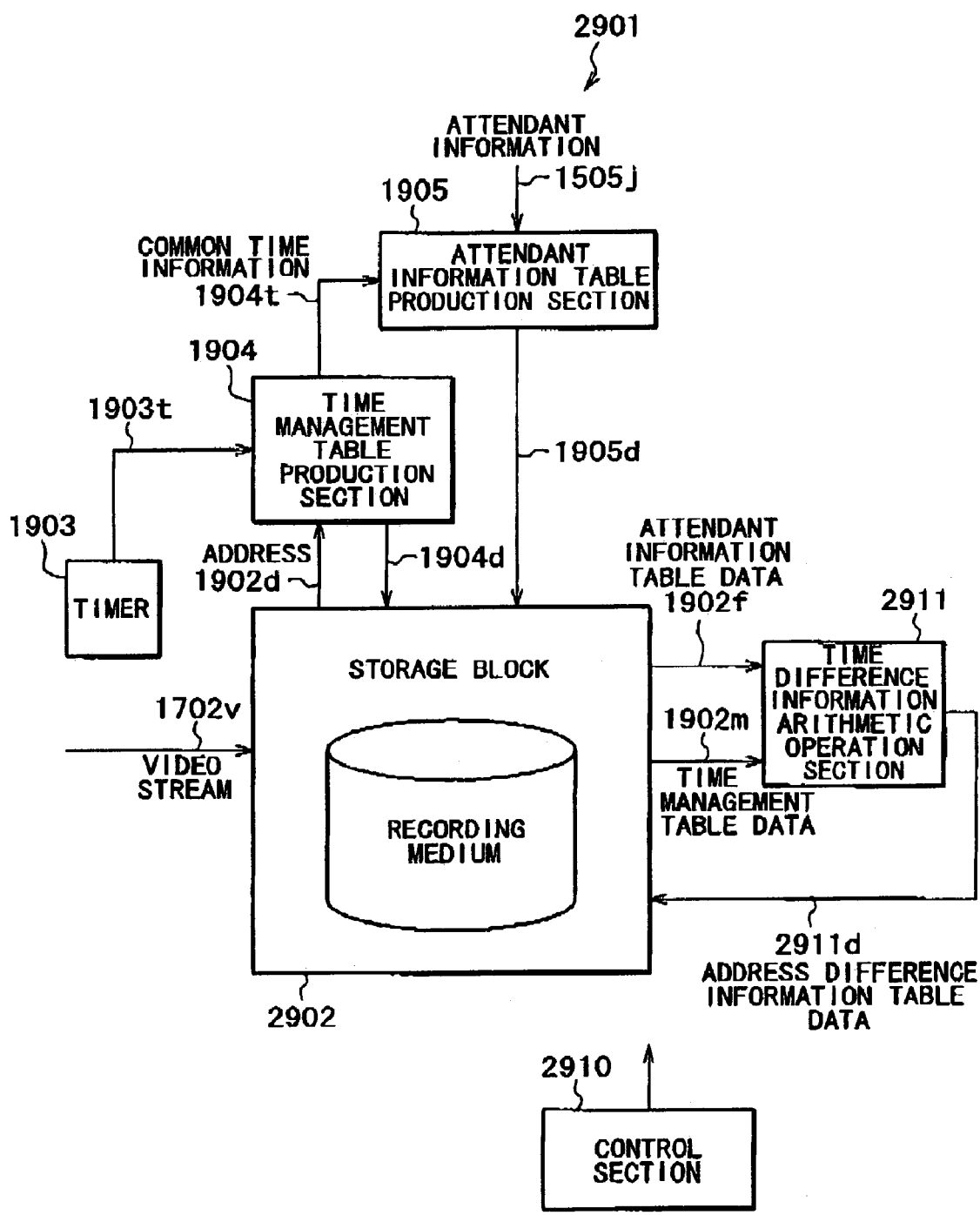
FIG. 32 is a block diagram showing a form of the recording section shown in FIG. 1 which involves address difference arithmetic operation.
Figure 33:
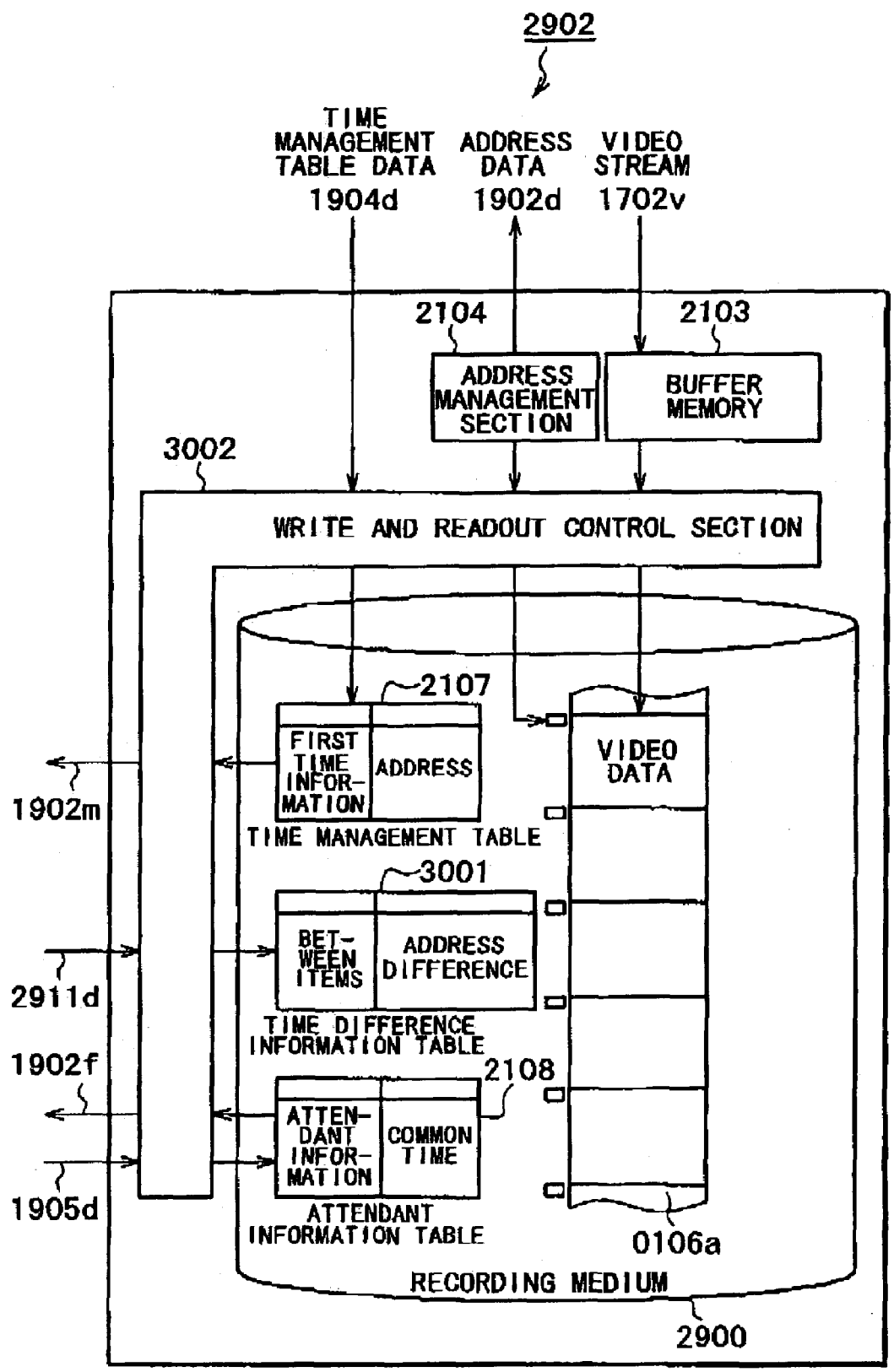
FIG. 33 is a block diagram showing a still further form of the storage block shown in FIG. 1.

FIG. 32 shows a yet further form of the recording section which has an address difference arithmetic operation function, and FIG. 33 shows a block configuration of a storage block built in the recording section.

Referring first to FIG. 32, the recording section 2901 shown includes a storage block 2902; a timer 1903; a time management table production section 1904; an attendant information table production section 1905; a address difference information arithmetic operation section 2911; and a control section 2910 for controlling operation of the entire recording section 2901.

The address difference information arithmetic operation section 2911 is prepared as a computer program, and fetches attendant information table data 1902f from an attendant information table 2108 formed in a recording medium 2900 of the storage block 2902 shown in FIG. 33 and further fetches time management table data 1902m from a time management table 2107. Then, where a plurality of pieces (items) of attendant information are involved in the attendant information table data 1902f, the address difference information arithmetic operation section 2911 arithmetically operates a difference in address from a certain piece of attendant information to a next piece of attendant information based on the table data 1902f and 1902m, and sends the address difference as address difference information table data 2911d to the storage block 2902. The address difference information table data 2911d include such items as described above and address difference data between the items.

A write and readout control section 3002 of the storage block 2902 receives the address difference information table data 2911d and records them as an address difference information table 3001 into the recording medium 2900.

The address difference information table 3001 is referred to upon utilization to facilitate, based on the magnitude of the difference between addresses from a certain piece of attendant information to a subsequently generated piece of attendant information, estimation of contents occurring within the period. For example, in editing operation, when a head search is performed for an image with which a game is stopped because of rain, if records of the address difference from a certain piece of attendant information to a next piece of attendant information are referred to, then candidate entry points for the scene can be narrowed down, and consequently, the editing operation can be performed efficiently.

The various forms described above can be configured otherwise such that at least one of an attendant information table and a link table as well as a time management table is recorded onto a data recording medium other than a data recording medium on which video data are recorded.

Further, where the data recording medium in the various forms described above is formed from a hard magnetic disk, a magneto-optical disk, an optical disk, a semiconductor memory or some other recording medium of the non-removable type, management of attendant information and video is facilitated, and the process for matching the attendant information and the video data with each other is simplified and besides otherwise possible loss of them can be prevented.

Besides, if various types of recording media are applied, databases of various configurations can be constructed.

On the other hand, where the data recording medium is formed from a hard magnetic disk, a magneto-optical disk, an optical disk, a semiconductor memory or some other recording medium of the removable type or additionally includes some of the non-removable data recording media mentioned above, video data or/and attendant information can be managed separately from each other, and since various types of recording media can be applied, the degree of freedom in product design is augmented.

Furthermore, a data recording medium by itself can be sold as a commodity such as a recording medium on which attendant information is recorded, or a recording medium on which video data are recorded, or a recording medium on which attendant information and video data are recorded.

Further description is given below of the attendant information.

As one of forms of recording of the attendant information, it is possible to record the attendant information as significance adapted type information by a character representation based on a character string. Since this configuration allows inputting by a character representation when attendant information is inputted by an inputting operation, an operation for preparations of attendant information can be performed readily and the frequency in occurrence of an erroneous input decreases when compared with that by inputting, for example, only of numerical values and the convenience in use is improved advantageously. Further, the accuracy in search upon utilization of the recorded data can be improved.

As another form of recording of the attendant information, the recording section is configured so as to record attendant information as order adapted type information by a numerical representation wherein the numerical value increases monotonously as the time passes.

The order of recording of video data when a video stream is recorded continuously is an order based on the time or the elapsed time, and the video data are recorded in order without involving a reversal in terms of the time of occurrence or the elapsed time. In this connection, not only to a linear type recording apparatus which uses a tape magnetic recording medium onto which data are recorded sequentially but also to a non-linear type recording apparatus which uses a disk type recording medium or a semiconductor memory which allows random accessing thereto, continuous recording is performed preferably in order to reduce the overhead required for positioning processing arithmetic operation and so forth. This is referred to as "order adapted type" in the present specification.

Accordingly, also guide information generated incidentally to video data, that is, attendant information, is information of the order adapted type. Therefore, in the present embodiment, guide information is represented in a numerical value representation wherein the numerical value increases monotonously as the time elapses. For example, taking a baseball game as an example, the score data are represented with numerical values which increase monotonously. FIG. 34 illustrates an example of order adapted type information by a numerical value representation of such score data as just mentioned.

In a baseball game, the transition of the inning for offence and defense is irreversible, and the top (first half) and the bottom (second half) of a certain inning appear in this order without fail and are irreversible. In other words, different innings do not appear nor are played again at all, and the game does not proceed reversely at all with the top and the bottom reversed. This similarly applies also to the out count, and returning from the second out to the first out does not occur at all. Further, events occur stepwise, and the top and the bottom underlie a layer of the inning, and an out count underlies another layer of the top and the bottom.

Where the hierarchical structure just described is represented as an order adapted type representation, if the first out in the bottom of the seventh inning is represented, by arranging numerals in the order of the hierarchical layers, as
"07/2/1"
where the top and the bottom are represented by 1 and 2, respectively. In this instance, the numerical value to be applied to the bottom is represented so as to be greater than the numerical value to be applied to the top. Further, the slash mark (/) is added for the convenience of description, and actual guide information is represented as a numerical value of four figures (in the case of the decimal notation) with the slash marks removed as seen in FIG. 34.

As a result, each piece of guide information is represented by a numerical value which increases monotonously in order of appearance, and besides, a particular figure in the numerical value also represents contents of the game. Accordingly, for example, if an inning or the top or the bottom of an inning to be noticed is designated upon utilization of the recorded data, then a search and indexing of the guide information can be performed very rapidly and efficiently numerically based on the monotonously increasing characteristic.

Incidentally, where the strike and the out are added as numerical values in a lower hierarchical layer in the case described above, it sometimes occurs that, for example, a batter gets to first base on a hit with the count of two balls, one strike with one out in the bottom of the seventh inning and, upon batting of the next batter, the same count appears with that of the preceding batter. Further, the guide information possibly. indicates some numerical reversal. In particular, if the guide information representing the count of the preceding batter is
"07/2/1/1/2"
and the guide information representing the count of the next batter begins with
"07/2/1/00"
and then the count becomes
"07/2/1/1/2"
same as the count of the preceding batter, then the numerical value of the guide information does not increase monotonously.

Thus, in the present embodiment, a layer of the number of batters is inserted between the layer of the out count and the layer of the ball/strike. FIG. 35 illustrates examples of such order adapted type information by such an expanded numerical representation of score data as just described.

Where the expanded numerical expression is used, if the count of the second batter is 2 balls, one strike, then the guide information is given as a numerical value of 8 figures (in the case of the decimal notation) of
"07/2/1/03/1/2"

Thus, where the guide information is handled as a numerical value, the monotonously increasing characteristic can be maintained while eliminating reversal of numerical values or appearance of the same numerical value in the guide information. In this manner, the present embodiment allows a reasonable configuration of attendant information by a combination of the irreversibility of proceeding during a game and the monotonously increasing characteristic of the numerical value.

As a further form, the recording section forms guide information from a combination of a rough classification representation and a fine classification representation, and records the rough classification representation as order adapted type information by a numerical representation wherein the numerical value increases monotonously as the time passes, and records the fine classification representation as significance adapted type information by a character representation based on a character string.

By the configuration just described, upon utilization of the recorded data, a rough search can be executed efficiently by a search of rough classification representations of the guide information first, and then another search with a higher degree of accuracy can be performed by a search of fine classification representations. Consequently, the search efficiency and the search accuracy can be improved as a whole.

For example, in recording of a soccer game, for a representation of a rough classification of guide information for 45 minutes of the first half and 45 minutes of the second half, a numerical representation wherein the numerical value increases monotonously each time a unit of one minute passes is used. Then, in a lower layer of each numerical value of the rough representation formed in a unit of one minute, a player who has shot is represented in a character string as a fine classification representation. FIG. 36 illustrates an example of guide information by order adapted type information by a numerical value representation and by significance adapted type information by a character representation as just described.

As seen in FIG. 36, one minute (whose numerical value is 38) from 38 minutes to 39 minutes of the first half (whose numerical value is 1) is represented by a numerical value, and shoots within the one minute are each represented in a character string together with its player in order of the occurrence.

By recording attendant information using both of a representation of a rough classification and of a fine classification in this manner, upon utilization of the recorded data, a rough classification search of the guide information corresponding to a noticed time is performed at a high speed, and then a fine search and indexing of a shoot can be performed based on a fine classification representation.

Now, a data recording medium according to the present invention is described.

The data recording medium according to the present invention may be a removable HDD, a recording medium in which a removable semiconductor memory in the form of a small peace or a card as represented by a memory stick (commodity name) is built in, a flexible disk, a cassette video medium, an optical disk medium or the like.

On a data recording medium as an embodiment of the present invention, attendant information which varies, as the time passes, in parallel to video data which are recorded and stored separately on a different recording medium and are matched with first time information based on an arbitrary first time base and an attendant information table, wherein the attendant information is matched with second time information based on an arbitrary second time base when the attendant information is generated, are recorded in a computer-readable manner, and also, a link table representative of matching information between the first time base and the second time base or between the first time information and the second time information is recorded in a computer-readable manner. In short, the data recording medium has at least the above-mentioned information recorded in a computer-readable manner thereon.

Consequently, a computer can read, based on any piece of the recorded attendant information, corresponding second time information from the attendant information table and then read either matching between the second time base and the first time base or the first time information corresponding to the second time information from the link table. As a result, the computer can specify, based on the first time information, a corresponding portion of the video data recorded and stored separately on the different recording medium. It is to be noted that, since the different recording medium originally has recorded thereon matching information between the addresses on the recording medium and the video data, the pertaining portion of the video data can be reproduced based on the address of the specified portion.

On a data recording medium according to another embodiment of the present invention, at least attendant information which varies, as the time passes, in parallel to video data which are recorded and stored separately on a different recording medium and are matched with common time information based on an arbitrary time base and the common time information corresponding to the attendant information when the attendant information is generated are recorded in a computer-readable manner.

Accordingly, a computer can read, from the data recording medium, that of the common time information which corresponds to each of pieces of the recorded attendant information. As a result, the computer can specify, based on the common time information, a corresponding portion of the video data recorded and stored separately on the different recording medium. It is to be noted that, since the different recording medium originally has recorded thereon matching information between the addresses on the recording medium and the video data, the pertaining portion of the video data can be reproduced based on the pertaining address of the specified portion.

On a data recording medium according to a further embodiment of the present invention, at least attendant information which varies, as the time passes, in parallel to video data which are recorded and stored separately on a different recording medium and are matched with address information on the different recording medium and the address information on the different recording medium when the attendant information is generated are recorded in a computer-readable manner.

Accordingly, a computer can read, from the data recording medium, that of the address information of the different recording medium which corresponds to each of pieces of the recorded attendant Information, then specify, based on the address information, a corresponding portion of the video data recorded and stored separately on the different recording medium, and reproduce the pertaining portion.

Further, each of the data recording media of the embodiments described above can be configured such that at least part of the video data originally recorded on a different data recording medium is recorded thereon. Accordingly, for the address information in this instance, the address information on the pertaining data recording medium can be applied instead of the address information on the separate data recording medium.

As described above, according to the gist of the present invention, while, during recording of a material for gathering data (for example, an image and/or sound in relay of a sports game or an on-the-spot relay), attendant information (for example, count data or score book data as the score) is generated as information relating to the game, paying attention to the fact that the attendant information is generated and updated as the time passes similarly to the material, video data recorded in a matched relationship with the attendant information are used and the attendant information is utilized as guide data for the material for gathering data and further as bookmarks thereby to realize efficient editing and search.

In other words, eliminating such "memorandum" by manual operation and reference to it during and after recording of, for example, a sports game, as have been performed conventionally in an editing and storing operation of a material for gathering data, attendant information is generated by manual operation during or after recording of an on-the-spot relay, and the attendant information and real-time time codes of the recording material are recorded in a linked relationship through intervention of real-time data of the game with regard to which the time or the elapsed time is recorded to achieve improvement of the efficiency in later editing and storing operations and the facility in search of the material data. Further, where the recording medium for a recording material such as, for example, video data and the recording medium on which metadata consisting principally of attendant information are recorded are formed separately from each other, the convenience in management and use is improved and the recording media can be sold as separate commodities from each other.

Further, the data recording method and the data recording system according to the present invention can be configured such that video data are recorded in a matched relationship with the addresses on a data recording medium (referred to as medium A) while a piece of attendant information is recorded in an associated relationship with a pertaining address of the data recording medium (medium A) on the data recording medium (medium A) or a different data recording medium (medium B). Where the video data and the attendant information are recorded without intervention of time information in this manner, not only the process regarding the attendant information is simplified, but also any piece of the attendant information and the pertaining address data (an address of the medium A) can be recorded not on the data recording medium (medium A) which has the address but on the different data recording medium (medium B). This signifies that the address data of the medium A can be recorded on the different medium B and besides together with the attendant information. Thus, the medium A and the medium B can be managed separately from each other, and consequently, there is an advantage that the opportunity of selling of them as commodities and the business takes place.

In summary, present invention achieves the following substances and advantages.

1. Real-time attendant information (such as score data with time) which is generated as the time passes with a material (video data) of an object of recording or attendant information formed off-line is used as guide information for search or editing of the recorded material.
2. First time information which functions as a time code of a material of recording and second time information which represents a flow of attendant information are matched with each other to allow reference of the recorded material.
3. Improvement in searchability and accessibility of an image by archives wherein a recorded material and attendant information are matched with each other is achieved.
4. Improvement in searchability and accessibility of stored materials is achieved to allow reasonable management of the stored materials.
5. The recording medium for a recorded material and the recording medium for attendant information are managed independently of each other. Each of the recording media can be sold as an independent commodity.
6. Augmentation in efficiency in head search and determination of an editing point of a recorded material is achieved to improve the productivity in an editing operation.
7. Augmentation in efficiency in production of a broadcasting material is achieved using real-time event information such as, for example, score data in a sports game.

The event information may include a sports game of the baseball, soccer, marathon or the like, a fixed spot location program of a car race or the like, a variety program, a concert and so forth. Further, associated use of the video data searching system or the video data editing system with an existing apparatus such as a VTR, a Sports Coder or a speed gun is permitted.

While preferred embodiments of the present invention have been described using specific terms, such description is for illustrative purposes only, and it is to be understood that changes and variations may be made without departing from the spirit or scope of the following claims.

What is claimed is:

1. A data recording method, comprising the steps of:
   fetching contents in a time series relationship as video data, the contents including an image with sound, an image or sound which vary as time passes, the image being a moving picture or/and a still picture;
   recording the video data into a data recording medium; and
   recording first matching information representative of direct or indirect matching between the video data and first time information based on an arbitrary first time base, attendant information to the contents which varies in parallel to the contents, second matching information representative of matching between the attendant information and second time information based on an arbitrary second time base, and third matching information representative of matching between the first time base and the second time base or between the first time information and the second time information into the data recording medium or/and a different arbitrary data recording medium.

2. A data recording method according to claim 1, wherein the attendant information includes a plurality of pieces of information, and a difference in time from a certain one to a next one of the pieces of attendant information is arithmetically operated based on the time information and recorded.

3. A data recording method according to claim 1, wherein the attendant information is order adapted type information by a numerical expression wherein the numerical value increases as the time passes.

4. A data recording method according to claim 1, wherein the attendant information is significance adapted type information by a character representation based on a character train.

5. A data recording method according to claim 1, wherein the attendant information is formed from a combination of a rough classification representation and a fine classification representation, and the rough classification representation is order adapted type information by a numerical expression wherein the numerical value increases as the time passes while the fine classification representation is significance adapted type information by a character representation based on a character train.

6. A data recording method according to claim 1, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

7. A data recording method, comprising the steps of:
   fetching contents in a time series relationship as video data, the contents including an image with sound, an image or sound which vary as time passes and with regard to which time information is based on a common time base, the image being a moving picture or/and a still picture;
   recording the video data into a data recording medium; and
   recording first matching information representative of direct or indirect matching between the video data and time information based on an arbitrary time base, attendant information to the contents which varies in parallel to the contents, and second matching information representative of matching between the attendant information and the time information into the data recording medium or/and a different arbitrary data recording medium.

8. A data recording method according to claim 7, wherein the attendant information includes a plurality of pieces of information, and a difference in time from a certain one to a next one of the pieces of attendant information is arithmetically operated based on the time information and recorded.

9. A data recording method according to claim 7, wherein the attendant information is order adapted type information by a numerical expression wherein the numerical value increases as the time passes.

10. A data recording method according to claim 7, wherein the attendant information is significance adapted type information by a character representation based on a character train.

11. A data recording method according to claim 7, wherein the attendant information is formed from a combination of a rough classification representation and a fine classification representation, and the rough classification representation is order adapted type information by a numerical expression wherein the numerical value increases as the time passes while the fine classification representation is significance adapted type information by a character representation based on a character train.

12. A data recording method according to claim 7, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

13. A data recording method, comprising the steps of:
fetching contents in a time series relationship as video data, the contents including an image with sound, an image or sound which vary as time passes, the image being a moving picture or/and a still picture;
recording the video data into a data recording medium; and
recording first matching information representative of matching between the video data and recorded positions of the video data, attendant information to the contents which varies in parallel to the contents, and second matching information representative of matching between the attendant information and the recorded positions of the video data into the data recording medium or/and a different arbitrary data recording medium.

14. A data recording method according to claim 13, wherein the attendant information includes a plurality of pieces of information, and a difference in recorded position from a certain one to a next one of the pieces of attendant information is arithmetically operated based on the recorded positions and recorded.

15. A data recording method according to claim 13, wherein the attendant information is order adapted type information by a numerical expression wherein the numerical value increases as the time passes.

16. A data recording method according to claim 13, wherein the attendant information is significance adapted type information by a character representation based on a character train.

17. A data recording method according to claim 13, wherein the attendant information is formed from a combination of a rough classification representation and a fine classification representation, and the rough classification representation is order adapted type information by a numerical expression wherein the numerical value increases as the time passes while the fine classification representation is significance adapted type information by a character representation based on a character train.

18. A data recording method according to claim 13, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

19. A data recording system, comprising:
a material processing section for fetching contents in a time series relationship as video data and processing the video data, the contents including an image with sound, an image or sound which vary as time passes, the image being a moving picture or/and a still picture;
an attendant information processing section for fetching attendant information to the contents which varies in parallel to the contents and processing the attendant information; and
a recording section including a mechanism for recording data into at least one data recording medium and operable to record the video data into the data recording medium and record first matching information representative of direct or indirect matching between the video data and first time information based on an arbitrary first time base, the attendant information, second matching information representative of matching between the attendant information and second time information based on an arbitrary second time base, and third matching information representative of matching between the first time base and the second time base or between the first time information and the second time information into the data recording medium or/and a different arbitrary data recording medium.

20. A data recording system according to claim 19, wherein the attendant information includes a plurality of pieces of information, and said recording section arithmetically operates a difference in time from a certain one to a next one of the pieces of attendant information based on the time information and records the difference in time.

21. A data recording system according to claim 19, wherein said recording section records the attendant information as order adapted type information by a numerical expression wherein the numerical value increases as the time passes.

22. A data recording system according to claim 19, wherein said recording section records the attendant information as significance adapted type information by a character representation based on a character train.

23. A data recording system according to claim 19, wherein the attendant information is formed from a combination of a rough classification representation and a fine classification representation, and said recording section records the rough classification representation as order adapted type information by a numerical expression wherein the numerical value increases as the time passes and records the fine classification representation as significance adapted type information by a character representation based on a character train.

24. A data recording system according to claim 19, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

25. A data recording system, comprising:

a material processing section for fetching contents in a time series relationship as video data and processing the video data, the contents including an image with sound, an image or sound which vary as time passes and with regard to which time information is based on a common time base, the image being a moving picture or/and a still picture;

an attendant information processing section for fetching attendant information to the contents which varies in parallel to the contents and processing the attendant information; and a recording section including a mechanism for recording data into at least one data recording medium and operable to record the video data into the data recording medium and record first matching information representative of direct or indirect matching between the video data and time information based on an arbitrary time base, the attendant information, and second matching information representative of matching between the attendant information and the time information into the data recording medium or/and a different arbitrary data recording medium.

26. A data recording system according to claim 25, wherein the attendant information includes a plurality of pieces of information, and said recording section arithmetically operates a difference in time from a certain one to a next one of the pieces of attendant information based on the time information and records the difference in time.

27. A data recording system according to claim 25, wherein said recording section records the attendant information as order adapted type information by a numerical expression wherein the numerical value increases as the time passes.

28. A data recording system according to claim 25, wherein said recording section records the attendant information as significance adapted type information by a character representation based on a character train.

29. A data recording system according to claim 25, wherein the attendant information is formed from a combination of a rough classification representation and a fine classification representation, and said recording section records the rough classification representation as order adapted type information by a numerical expression wherein the numerical value increases as the time passes and records the fine classification representation as significance adapted type information by a character representation based on a character train.

30. A data recording system according to claim 25, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

31. A data recording system, comprising:

a material processing section for fetching contents in a time series relationship as video data and processing the video data, the contents including an image with sound, an image or sound which vary as time passes, the image being a moving picture or/and a still picture;

an attendant information processing section for fetching attendant information to the contents which varies in parallel to the contents and processing the attendant information; and a recording section including a mechanism for recording data into at least one data recording medium and operable to record the video data into the data recording medium and record first matching information representative of matching between the video data and recorded positions of the video data, the attendant information, and second matching information representative of matching between the attendant information and the recorded positions of the video data into the data recording medium or/and a different arbitrary data recording medium.

32. A data recording system according to claim 31, wherein the attendant information includes a plurality of pieces of information, and said recording section arithmetically operates a difference in recorded position from a certain one to a next one of the pieces of attendant information based on the recorded positions and records the difference in recorded position.

33. A data recording system according to claim 31, wherein said recording section records the attendant information as order adapted type information by a numerical expression wherein the numerical value increases as the time passes.

34. A data recording system according to claim 31, wherein said recording section records the attendant information as significance adapted type information by a character representation based on a character train.

35. A data recording system according to claim 31, wherein the attendant information is formed from a combination of a rough classification representation and a fine classification representation, and said recording section records the rough classification representation as order adapted type information by a numerical expression wherein the numerical value increases as the time passes and records the fine classification representation as significance adapted type information by a character representation based on a character train.

36. A data recording system according to claim 31, wherein the data recording medium includes one of a non-removable hard magnetic disk, a non-removable magneto-optical disk, a non-removable optical disk, a non-removable semiconductor memory, a removable hard magnetic disk, a removable magneto-optical disk, a removable optical disk, a removable semiconductor memory and a removable magnetic tape.

37. A computer-readable medium encoded with software having attendant information which varies, as time passes, in parallel to video data including an image with sound, an image or sound which vary as time passes is recorded, the image being a moving picture or/and a still picture, the video data being recorded separately in a matched relationship with first time information based on an arbitrary first time base, the attendant information being recorded in a computer-readable manner together with second time information based on an arbitrary second time base, and matching information representative of matching between the first time base and the second time base or between the first time information and the second time information is recorded in a computer-readable manner.

38. The computer-readable medium according to claim 37, wherein the video data are recorded in a computer-readable manner in addition to the attendant information.

* * * * *